United States Patent
Betts et al.

(10) Patent No.: US 9,322,915 B2
(45) Date of Patent: Apr. 26, 2016

(54) 360 DEGREE IMAGING SONAR AND METHOD

(71) Applicants: David A. Betts, Eufaula, AL (US); Sean M. DeHart, Eufaula, AL (US)

(72) Inventors: David A. Betts, Eufaula, AL (US); Sean M. DeHart, Eufaula, AL (US)

(73) Assignee: Johnson Outdoors Inc., Racine, WI (US)

(*) Notice: Subject to any disclaimer, the term of this patent is extended or adjusted under 35 U.S.C. 154(b) by 458 days.

(21) Appl. No.: 13/774,143

(22) Filed: Feb. 22, 2013

(65) Prior Publication Data

US 2013/0215719 A1    Aug. 22, 2013

Related U.S. Application Data

(60) Provisional application No. 61/601,947, filed on Feb. 22, 2012.

(51) Int. Cl.
*G01S 15/89*     (2006.01)
*G01S 7/521*     (2006.01)
*G01S 7/62*      (2006.01)

(52) U.S. Cl.
CPC ................ *G01S 15/89* (2013.01); *G01S 7/521* (2013.01); *G01S 7/6236* (2013.01); *G01S 7/6272* (2013.01)

(58) Field of Classification Search
CPC ....... G01S 7/521; G01S 15/89; G01S 7/6272; G01S 7/6236
USPC ......................................................... 306/104
See application file for complete search history.

(56) References Cited

U.S. PATENT DOCUMENTS 2,865,014 A * 12/1958 Malm ........................... 367/104
3,553,638 A *  1/1971 Sublett ................. G10K 11/355
                                                    367/104
4,285,485 A *  8/1981 Burke ........................... 367/173

(Continued)

FOREIGN PATENT DOCUMENTS

EP           1 353 404 A2    10/2003
WO      WO 2013126761 A1 *   8/2013

OTHER PUBLICATIONS

Imagenex Model 881A—Digital Multi-Frequency Imaging Sonar; Aug. 2002—Revised Jan. 2011; 3 pages (pp. 1-3).
Sonavision World Class Underwater Technology, Mercury Scanning Sonar—Clarity Without Compromise; known prior to Feb. 22, 2012; 2 pages.

(Continued)

*Primary Examiner* — Daniel Pihulic
(74) *Attorney, Agent, or Firm* — Reinhart Boerner Van Deuren P.C.

(57) ABSTRACT

A 360-degree sonar imaging system and method are provided. The system includes a sonar transducer assembly pod with tilted mechanically scanning sonar (MSS) transducers that is deployed into the water below the bottom of the boat. The system provides photo-like imaging of an area surrounding a boat which does not require the boat to be in motion. The pod is deployed by a variety of manual, (trolling motor, transom) or powered mechanical (bow, transom, or fairing block) deployment mechanisms to allow for deployment and retraction of the sonar transducer assembly. In particular embodiments, the MSS system communicates with a side-scan-sonar-imaging-equipped control head unit to display the images generated therefrom. Various speeds and sector scans are provided, as well as a locked side-scan sonar mode. Waypoint navigation and split screen views are also provided.

28 Claims, 23 Drawing Sheets

(56) References Cited

U.S. PATENT DOCUMENTS

| | | | |
|---|---|---|---|
| 4,590,337 A * | 5/1986 | Engelmore | 439/21 |
| 4,905,208 A | 2/1990 | Dick | |
| 4,989,530 A * | 2/1991 | Thompson et al. | 367/153 |
| 4,996,673 A * | 2/1991 | Brooke | 367/131 |
| 5,546,362 A | 8/1996 | Baumann et al. | |
| 5,594,707 A * | 1/1997 | Goto et al. | 367/107 |
| 5,675,552 A | 10/1997 | Hicks et al. | |
| 6,254,441 B1 | 7/2001 | Knight et al. | |
| 7,212,466 B2 | 5/2007 | Wilson | |
| 7,450,470 B2 | 11/2008 | Wilson | |
| 7,652,952 B2 | 1/2010 | Betts et al. | |
| 7,710,825 B2 | 5/2010 | Betts et al. | |
| 7,729,203 B2 | 6/2010 | Betts et al. | |
| 7,755,974 B2 | 7/2010 | Betts et al. | |
| 8,305,844 B2 * | 11/2012 | DePasqua | 367/107 |
| 2003/0203684 A1 * | 10/2003 | Healey | 440/6 |
| 2010/0256813 A1 | 10/2010 | Chiappetta et al. | |
| 2012/0014220 A1 | 1/2012 | DePasqua | |
| 2013/0215719 A1 * | 8/2013 | Betts et al. | 367/88 |
| 2014/0269164 A1 * | 9/2014 | Betts et al. | 367/7 |

OTHER PUBLICATIONS

Tritech International SeaKing Hammerhead DST Sonar; known prior to Feb. 22, 2012; 2 pages.
Tritech International Micron DST Sonar—Ultra Compact Chirp Digital Sonar; known prior to Feb. 22, 2012; 2 pages.
Tritech International Super SeaKing DST—New Generation Digital Chirp Sonar; known prior to Feb. 22, 2012; 2 pages.
Tritech International Super SeaPrince DST; known prior to Feb. 22, 2012; 2 pages.
JW Fishers Scanning Sonar; date last visited Feb. 7, 2012; 2 pages printed from internet http://www.jwfishers.com/scan650.htm.
Sonavision Products—SV 2020 Sonar; known prior to Feb. 22, 2012; 2 pages.
Sonavision Products—SV1010 Sonar; known prior to Feb. 22, 2012; 2 pages.
Kongsberg—6000 m Sonar Head Digital Telemetry; known prior to Feb. 22, 2012; 2 pages.
Kongsberg—1500 m Sonar Head Digital Telemetry; known prior to Feb. 22, 2012; 2 pages.
Kongsberg—650 m Sonar Head Digital Telemetry; known prior to Feb. 22, 2012; 2 pages.

* cited by examiner

360 DEGREE IMAGING SONAR AND METHOD

CROSS-REFERENCE TO RELATED PATENT APPLICATION

This patent application claims the benefit of U.S. Provisional Patent Application No. 61/601,947, filed Feb. 22, 2012, the entire teachings and disclosure of which are incorporated herein by reference thereto.

FIELD OF THE INVENTION

The present invention relates generally to sonar imaging systems for use in sport fishing applications such as in a fish finder, sonar depth sounder, etc., and more particularly to a 360-degree scan sonar imaging systems for imaging of the underwater environment around the watercraft, rather than just below or to the sides of the watercraft.

BACKGROUND OF THE INVENTION

Sonar devices that transmit sound waves have been used previously to obtain information about underwater articles, including fish, structures and obstructions, and the bottom. The sound waves travel from a transducer mounted to a bottom surface of the vessel through the water. The sound wave transmits from the sonar devices in diverging patterns. The sound waves contact underwater articles, which create return echoes. The transducer receives the return echoes and the sonar device analyzes the received echoes. A display device displays representations of the received echoes, for locating fish and other underwater articles.

The assignee of the instant application provides and has taught sonar imaging systems that are coupled to the watercraft to provide side scan images. Such systems include sonar imaging systems mountable to a motor (such as a trolling motor), a transom of the watercraft, or to the hull of the watercraft. These provide sonar imaging systems operable at multiple resonant frequencies for optimized performance at varying bottom depths. The teachings of such systems include those in U.S. Pat. No. 7,652,952, entitled Sonar Imaging System For Mounting To Watercraft, U.S. Pat. No. 7,710,825, entitled Side Scan Sonar Imaging System With Boat Position On Display, U.S. Pat. No. 7,729,203, entitled Side Scan Sonar Imaging System With Associated GPS Data, and U.S. Pat. No. 7,755,974, entitled Side Scan Sonar Imaging System With Enhancement, the teachings and suggestions of which are hereby incorporated in their entireties by reference thereto.

While such side scan sonar imaging systems have provided significant advantages to their users, they only provide a part of the picture of the environment around the boat from which a user may be fishing. Such users would benefit from a more complete picture of such environment around and below the boat.

Embodiments of the present invention provide such a 360-degree sonar imaging system and method. These and other advantages of the invention, as well as additional inventive features, will be apparent from the description of the invention provided herein.

BRIEF SUMMARY OF THE INVENTION

In view of the above, it is an objective of the present invention to provide a new and improved sonar imaging system, employing a mechanically-sweeping, or mechanically-scanning, sonar (MSS) that is capable of being connected to a surface watercraft, such as a fishing boat. In a particular embodiment, the boat does not need to be moving in order to generate the high-quality photo-like 360-degree sonar imagery. It is a further objective to provide a new and improved sonar imaging system that provides photograph-like imaging of the underwater environment for 360 degrees around and below the watercraft, as shown for example in FIGS. 29 and 30.

In certain embodiments of the invention having the active scan of the sonar elements, a user is able to see fish "move" across display. The user is also able to identify structure where submerged trees look like trees, rocks look like rocks, and the like, and hard and soft bottoms can be easily distinguished.

In at least one embodiment, the user is able to select a sector scan, or angled sonar image of less than 360 degrees. In such modes, the system provides an adjustable sweeping or scanning area (degrees), and adjustable direction (e.g. forward looking). In one embodiment the sonar scan imaging is available out to 240 feet away. The system preferably provides plug-n-play connectivity with side scan sonar imaging systems, such as 700, 800, 900, or 1100 Series Side Imaging® models w/Ethernet capability, available from the assignee of the present application. This allows for accessory add-ons to current and previously sold Side Imaging® units, e.g. the 798ci HD SI, 898c SI, 998c SI, and the 1198c SI.

In at least one embodiment, the system provides a transom-mounted deployment mechanism, which lowers the sonar pod, (that is, the sonar transducer assembly), into the water. In a particular embodiment, the transom-mounted deployment system includes a housing configured to mount to the transom of a boat, and an extendable shaft disposed at least partially within the housing, and when deployed, the sonar transducer assembly attached to one end of the extendable shaft disposed underwater. The sonar transducer assembly is closest to the boat in a retracted position and farthest from the boat in a deployed position. In more particular embodiments, the transom-mounted deployment mechanism further comprises a constant force spring configured to aid in the retraction of the sonar transducer assembly, and may also include a button or switch for local activation of a system for deployment or retraction of the sonar transducer assembly. In certain embodiments, the transom-mounted deployment mechanism is deployed and retracted by a powered drive mechanism. In alternate embodiments, the transom-mounted deployment mechanism is configured to be deployed and retracted manually In an alternate embodiment, the system provides for the attachment of the sonar pod to a trolling motor assembly. With this deployment mechanism, the mounting shaft may be attached to a non-rotating portion of a trolling motor support shaft by a quick connecting clamp. Alternately, the mounting shaft may be attached to some non-rotating portion of the trolling motor. In a further embodiment, the mounting shaft may be attached to a rotating portion of the trolling motor. The quick connecting clamp includes a resilient member, and a pivoting member configured to open for insertion and then close around to the non-rotating portion of a trolling motor support shaft. The quick connecting clamp further includes a lever having an over center cam, such that when the lever is folded against the pivoting member, the lever comes under tension from the resilient member such that the lever remains in position to secure the pivoting member in a closed position.

In certain embodiments, the deployment mechanism has a fairing block configured to protectively house the sonar transducer assembly in a retracted position. The fairing block is attached to the hull of a boat. The sonar transducer assembly may be deployed outside of the fairing block using a scissor-lift device mounted in the fairing block. In alternate embodiments, the sonar transducer assembly is deployed outside of the fairing block using a pair of swing arms configured to swing the sonar transducer assembly down from the fairing block such that forward motion of the boat urges the swing arms and sonar transducer assembly into the retracted position. The sonar transducer assembly may also have a lifting body shaped such that, when the sonar transducer assembly is deployed, its motion through the water causes a lifting force that urges the sonar transducer assembly into the retracted position inside of the fairing block.

In a particular embodiment, the sonar transducer assembly is deployed outside of the fairing block at the end of an articulating arm, the articulating arm configured to be positioned by a connecting arm attached to a track at one end and to the articulating arm at another end. Additionally, the end of the connecting arm attached to the track is positioned via a magnetic connection to an adjacent magnet which can be moved along a shaft positioned within the fairing block. In a more particular embodiment, the magnet is attached to a threaded carrier, and the shaft is a screw which rotates to position the magnet at a desired position along the length of the screw.

In a further embodiment, the 360-degree imaging system includes a compass. A sonar transducer assembly controller is configured to process present and past (that is, "historic") data, including but not limited to GPS data, sonar data, and compass data, in a way that allows a user to record and store one or more waypoints at any selected location on the 360-degree sonar image. The controller is also configured to record and store a route having a series of waypoints, the controller further configured to cause the route to be displayed on the 360-degree sonar image.

In certain embodiments, the sonar transducer assembly has a housing with variable wall thickness such that each of a plurality of rays emanating at various angles from the sonar element(s) and passing from inside of the housing to outside of the housing passes through a relatively constant amount of the housing wall. Further, the housing containing the sonar transducer assembly may be filled with an acoustic coupling fluid, such as oil.

In a particular embodiment, the sonar transducer assembly includes a rotating carrier having at least one sonar element attached thereto, a circuit board configured to maintain contact with the rotating carrier, and a stepper motor to rotate the rotating carrier. The circuit board may have concentric circular tracks to maintain an electrical connection with electrical contacts on the rotating carrier. In at least one embodiment, the stepper motor has a rotatable shaft coupled to the rotating carrier. The sonar transducer assembly may further include control circuitry, at least one sonar receiver, and an electromagnetic (EM) shield. In particular embodiments, the EM shield is attached to the circuit board configured to maintain contact with the rotating carrier, the attachment being between the circuit board and the rotating carrier. In at least one embodiment, the EM shield is roughly the same shape as the circuit board, and made from fiberglass with copper laminate on one side. In certain embodiments, the EM shield has cutouts where the rotating carrier makes electrical contact with the circuit board.

In at least one embodiment in which the 360-degree imaging system is used for ice fishing, the system can be deployed through the ice via a stabilizing member, which may include a tripod-like arrangement, a ring-type assembly, or a plank stabilizer to permit convenient use of the 360-degree imaging system for ice fishing applications.

In at least one embodiment, the 360-degree imaging system includes two-sonar-element scanning for faster 360-degree sweeps, although fewer or more sonar elements may be used as desired. In certain embodiments, the two-sonar-element scanning, the 360-degree imaging system allows the two sonar elements to be locked in a side position for traditional two element side scan operation such as that described above. To optimize system performance from the surface of the water, the first and second sonar elements may be mounted to give the imaging beams a depression angle of between 20 and 40 degrees. In a particular embodiment, the depression angle is 30 degrees.

The 360-degree imaging system includes a sonar receiver. In a further embodiment, two sonar receivers are used, wherein each sonar receiver is coupled to a separate one of the two sonar elements, such that each sonar receiver processes sonar signals from a respective sonar element.

Another embodiment includes the ability to mark waypoints from the display screen. In this embodiment, the user moves the cursor to the desired position on the 360 sonar screen. When the "Mark" button is pressed the present pixel location is converted to a sonar range and referenced back to the historic sonar ping number (HSPN) data used to draw that display segment. The stored boat GPS position, boat heading, water depth, transducer side (since there are two elements) and transducer bearing are recalled for that HSPN. If the display is not presently using slant angle corrected data, then the sonar range is slant angle range corrected using the depth from that HSPN. The GPS position for that waypoint is calculated from the HSPN boat position offset by the slant angle corrected range at a bearing that is calculated from the HSPN boat bearing corrected for the HSPN transducer side and bearing.

One particular embodiment uses a constant-force spring in the deployment mechanism to aid in quicker retraction speeds. The constant force spring is preferably a coil of stainless steel that unrolls (like a tape measure) as the pod is deployed down. It provides about approximately six lbs. of extra force that counterbalances the weight of the moving assembly, making it easier to retract.

Embodiments of the deployment system of the present invention allow the sonar pod to drop in the water without causing a stir. At the user's command, the 360-degree sonar imaging system includes a deployment mechanism that drops below the boat's hull and prop for an unobstructed, 360-degree view. The system operates silently, escaping the notice of nearby fish. In one embodiment, there is provided two deployment options. When the timing is right, a user can deploy the 360-degree sonar imaging system using a remotely located imaging system, such as one of the Humminbird® units discussed above, or the control buttons found on the transducer deployment mechanism. This allows easy management of the depth to which the transducer pod deploys to avoid grounding in shallow water.

The two sonar transducer elements form sonar beams that are wide in the vertical direction for a good area of coverage and narrow in the horizontal direction for good image definition. For example, a narrow beam may be thought of as one less than about five degrees wide, while a wide beam may be thought of as greater than about 60 degrees wide, wherein the beam widths are computed at the 3 dB points. To aid in the understanding of the beam, one can visualize 360-degree sonar imaging as a thin sonar wall extending, e.g. 150 feet in one embodiment, to either side a user's boat. This wall rotates to effectively create, in this exemplary embodiment, a 300- foot circle, updated in real-time, which enables the user to "see" areas not typically reached with conventional sonar systems. Because the sonar wall moves to create the displayed images, the watercraft in which the system is installed does not have to.

In one embodiment, multiple rotational speeds are provided for rotation the sonar element(s). For greater on-water flexibility, 360-degree sonar imaging lets the user choose from five beam speed settings. Lower beam speeds lead to higher image quality but lower refresh rates (whereby the "refresh rate" is measured in revolutions per minute. Conversely, higher beam speeds result in lower image quality but higher refresh rates. With five options, a user can find a desirable setting given the user's boat speed, water conditions and need for detail.

The new 360-degree imaging provided by embodiments of the present invention offers a detailed, 360-degree view around a user's boat. Like the side-scan sonar imaging described above, embodiments of the 360-degree sonar imaging system give high resolution, high quality sonar images of the underwater environment containing details of underwater objects and fish and shadows, as shown in FIGS. 29 and 30. But in this case, 360-degree coverage extends 150 feet in every direction around the boat. While trolling and even while sitting still, the user has a clear view of drop-offs, structure and cover. So the user can see where fish are hiding, before they see the user.

In at least one embodiment, the user can isolate the sweep area over a section of water from, e.g., 10 degrees to 360 degrees. The user can lock in the sonar beam to point anywhere, but the area in front of the boat is especially useful. With valuable intelligence on fish-holding structure and cover waiting up ahead, users (that is, fishermen) can cast their lines to productive areas without spooking fish. Because the beam has less ground to cover, the user will also benefit from a faster refresh rate. Embodiments of the present invention may also provide preset views, e.g. Front, Rear, Left, and Right. The user can also isolate these sweep areas and adjust their size.

As mentioned above, waypoint navigation is also provided. In such an embodiment, the user can mark interesting underwater structures or objects with a waypoint directly on the user's sonar imaging system display. The exact location of the waypoints can be stored in the unit's memory and may be viewed on GPS cartography.

In at least one embodiment, the user can choose from eight color palettes for more flexibility. Based on water conditions, the user can adjust sensitivity for the best returns and resultant images. The user can even adjust sharpness to enhance edges and detail depending on lighting.

In at least one embodiment the system provides split-screen views. A view of the 360-degree sonar imaging system shows a side-by-side screen view or combination view with GPS cartography, for example. Such combination views allow a user to see what is going on below the user's boat while GPS puts waypoints, routes and other navigational information at the user's fingertips.

Other features that may be included in various embodiments of the present invention include a one button "Quick View Sweep Area" selection, a menu selectable variable width and direction "Isolated Sweep Area", a mechanical sweeping system optimized for small boat mounting, a mechanical sweeping system optimized for use near the surface of the water, a mechanical sweeping system optimized for use with sport sonar fish finding equipment, a mechanical sweeping system that can be controlled from multiple Ethernet control heads, a mechanical sweeping system that can self-retract based on GPS speed, and a mechanical sweeping system that can be deployed to many different user selectable depths.

In one aspect, embodiments of the invention provide a 360-degree sonar imaging system that includes a sonar transducer assembly. The sonar transducer assembly includes a motor having a rotatable shaft, and a sonar element carrier having a pair of sonar elements mounted therein. The sonar element carrier is coupled to the rotatable shaft. The sonar transducer assembly also includes a controller, and transmit and receive electronics, for driving the sonar elements and for communicating information received from the sonar elements. In a particular embodiment, the rotatable shaft is configured to lock into position such that the sonar beams from the pair of sonar elements are directed in opposite directions, to obtain sonar imaging of the area to each side of the sonar transducer assembly.

Embodiments of the 360-degree sonar imaging system also include a tripod configured to rest on the bed of a body of water. The sonar transducer assembly is attached to an upper portion of the tripod, and connected to a control head remote from the sonar transducer assembly. The controller communicates with the control head to enable a display of a 360-degree sonar image on a display screen of the control head.

Embodiments of the 360-degree sonar imaging system further include a buoy configured with a flexible link between the buoy and the sonar transducer assembly allowing the entire assembly to float at or near the surface of a body of water. The sonar transducer assembly is attached to a lower portion of the buoy, and connected to a control head remote from the sonar transducer assembly.

In another aspect, embodiments of the invention provide a 360-degree sonar imaging system that includes a sonar transducer assembly. The sonar transducer assembly includes a motor having a rotatable shaft, and a sonar element carrier having a pair of sonar elements mounted therein. The sonar element carrier is coupled to the rotatable shaft. The sonar transducer assembly also includes a controller for driving the sonar elements and for communicating information received from the sonar elements. The sonar transducer assembly is attached to a first end of a hand-held rod, and a control head with portable display screen is attached, via cable, to a second end of the hand-held rod opposite the first end. The sonar transducer assembly further includes a stabilizing member attached to the hand-held rod between the first and second ends. The stabilizing member is configured to stabilize the shaft and sonar transducer assembly when the first end is place into water through a hole in a frozen surface of a body of water.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

In this application, several embodiments of a mechanically-sweeping, or mechanically-scanning, sonar (MSS), also referred to herein as a 360-degree sonar imaging system, along with embodiments of its user interface, will be discussed. It should be noted, however, that while a number of embodiments will be illustrated and/or discussed hereinbelow, such embodiments should be taken by way of example and not by way of limitation.

In one embodiment of the present invention, a mechanically sweeping sonar (MSS) assembly 100 (shown in FIGS. 1 and 2) connects via an Ethernet connection to a display unit, although other embodiments may communicate using other technology, e.g. Wi-Fi, Bluetooth, etc. In certain embodiments, the MSS assembly 100 includes a sonar transducer assembly and deployment mechanism, and is configured to be compatible with any unit that is both Ethernet and side scan imaging ("SI") capable. When a sonar transducer assembly, as will be described more fully below, is connected to a control head, several menus and views are added to the existing user interface. While the following will describe various embodiments of such a user interface, the examples are to demonstrate functionality. For example, whether the bearing scale and rings in some of the illustrations are shown or not shown, other embodiments may include them on that view.

Figure 19:
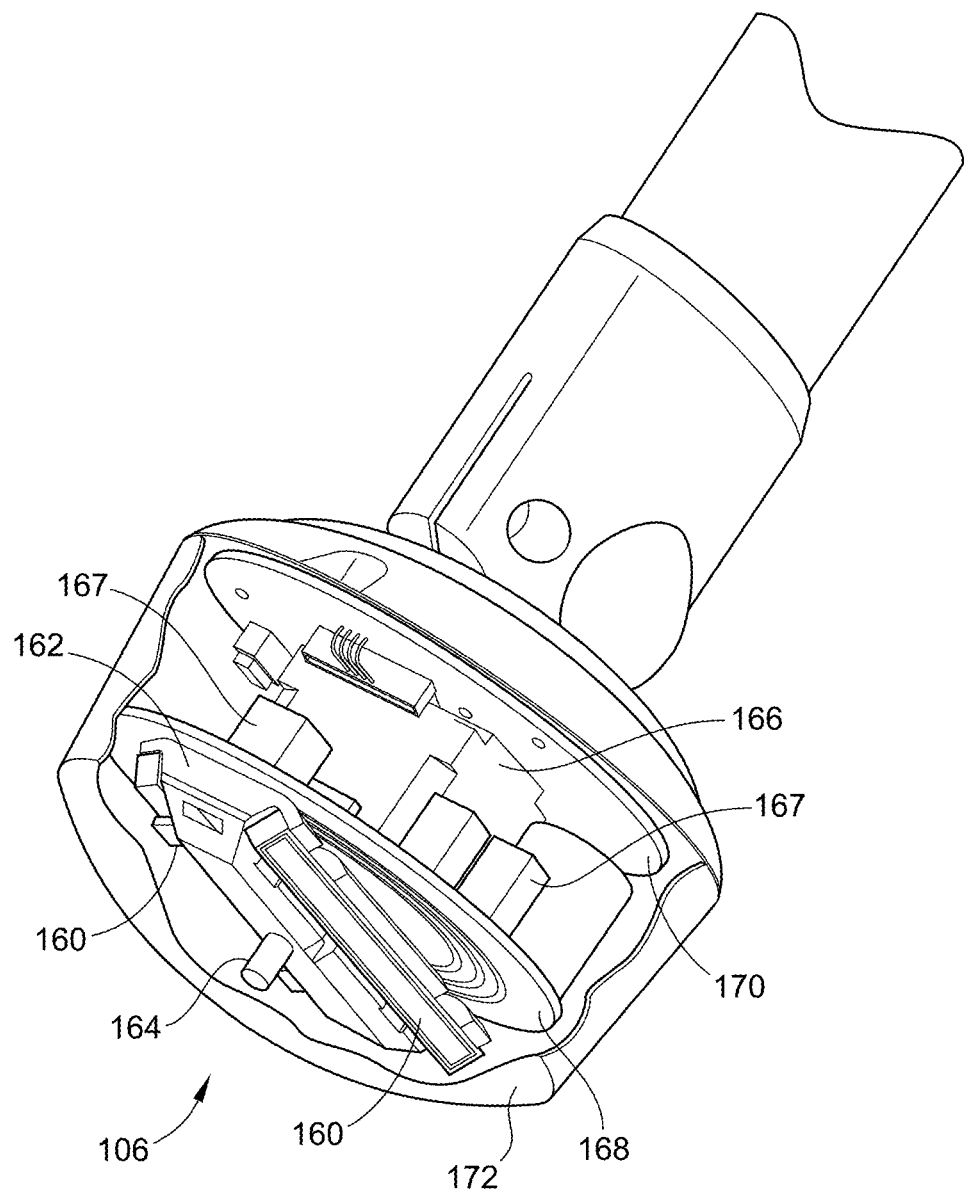
FIG. 19 is a pictorial illustration of the MSS assembly showing the rotating sonar elements in their carrier, circular track contacts for electrical connection thereto, control circuitry, motor for rotating the sonar carrier and elements mounted between the circuit control boards, and mounting element, in accordance with an embodiment of the invention.

FIG. 19 illustrates a cutaway view of the sonar transducer assembly 106, which includes the two sonar elements 160 carried in a rotating carrier 162 at the bottom of the sonar transducer assembly 106 contained within a pod housing 172.

However, embodiments of the invention also include sonar transducer assemblies having one sonar element 160. A description of such sonar elements 160 is contained in the above identified and incorporated patents, albeit the dimensions may be varied (e.g., length) for certain embodiments used in the sonar transducer assembly 106. In certain embodiments, the two sonar elements 160 are configured to transmit their respective sonar signals in opposite directions, e.g., 180 apart. As a result, a full 360-degree sonar scan may be performed when the rotating carrier 162 rotates 180 degrees. The rotating carrier 162 is attached to the shaft 164 of a stepper motor 166 that is positioned between the two circuit boards 168, 170 shown in this embodiment. Other types of motors may be used in other embodiments that do not include the features of isolated sweep scans (enabled by the stepper motor's adjustable angle control), but instead simply provide 360-degree spinning of the sonar elements 160.

Figure 29:
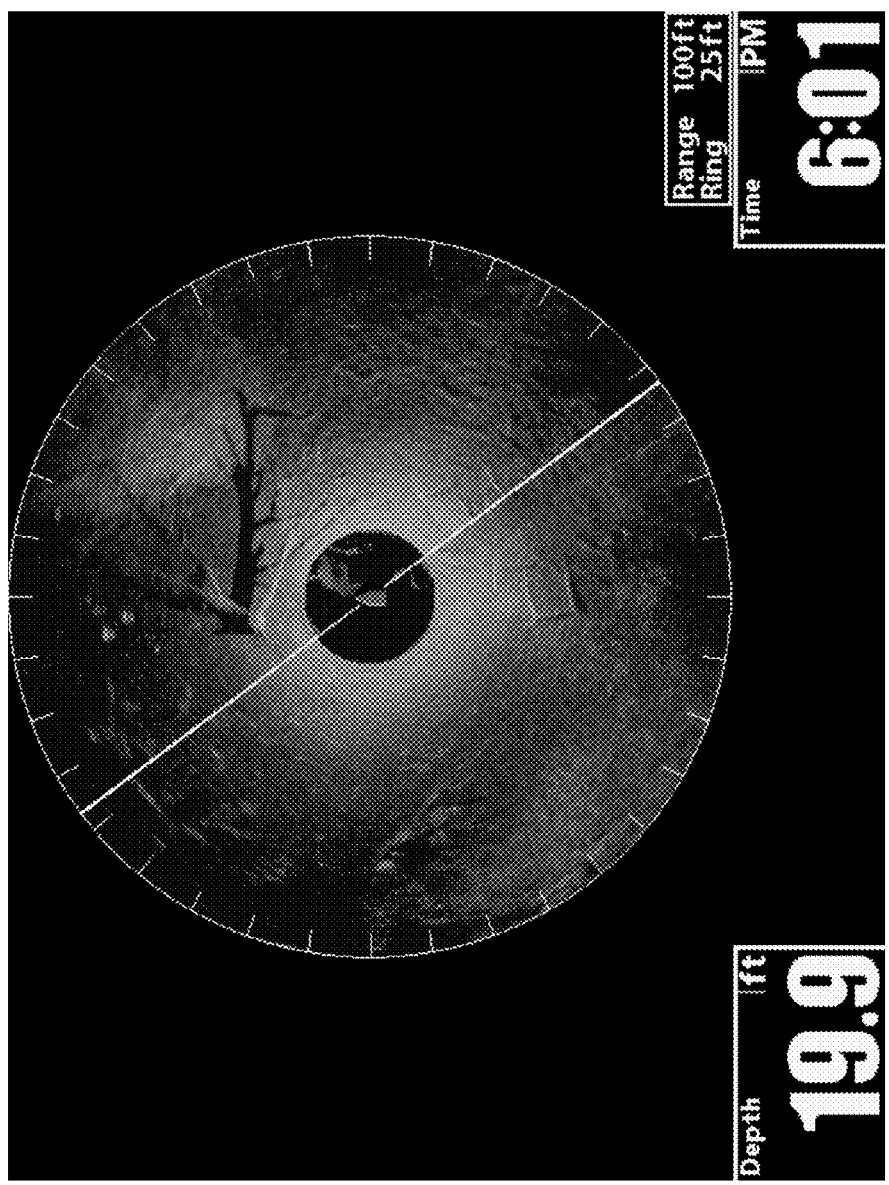
FIGS. 29 and 30 are photographic illustrations of an exemplary 360-degree display and a sector scan display, respectively, in accordance with an embodiment of the invention.
Figure 30:
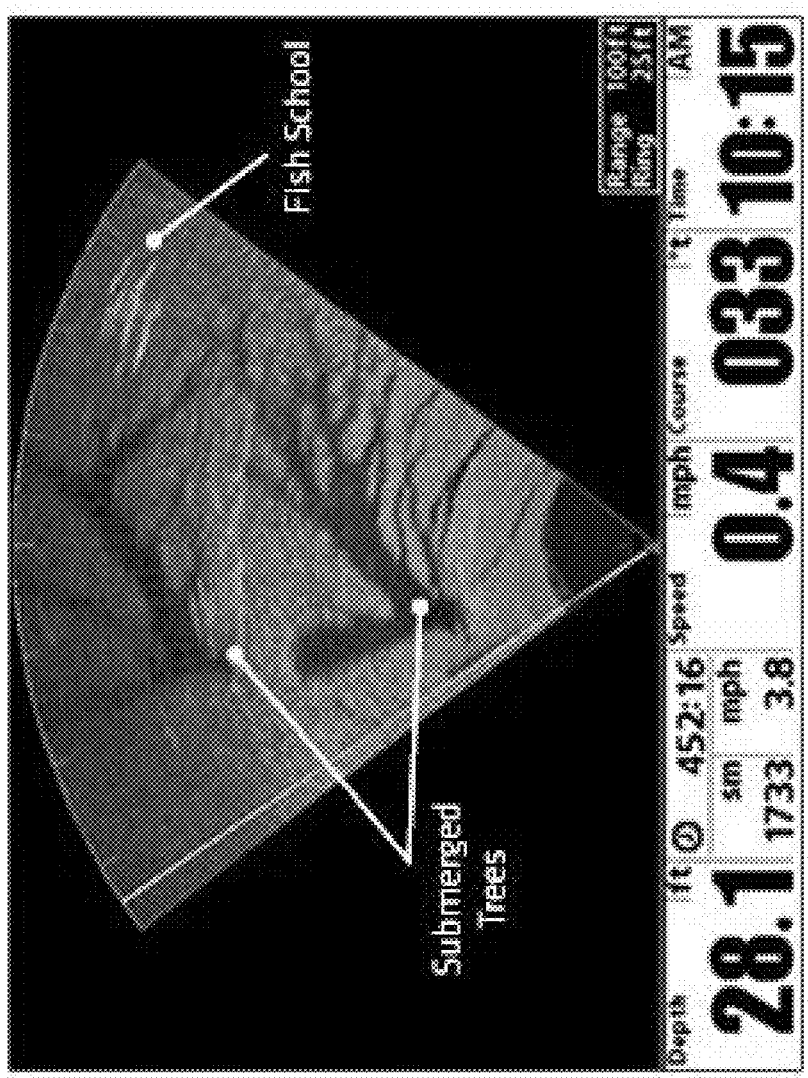

In a particular embodiment of the invention, the two sonar elements 160 form sonar beams that are wide in the vertical direction for a good area of coverage and very narrow in the horizontal direction for good image definition. As discussed above, a narrow beam may be thought of as one less than about five degrees, while a wide beam may be thought of as one greater than about 60 degrees, the respective beam widths measured at the 3 dB points. This beam configuration aids in producing high resolution, high quality, photo-like images on the display of the 360-degree sonar imaging system, as shown in FIGS. 29 and 30.

The bottom circuit board 168 includes a plurality of electrical contact tracks on the underside thereof to provide the electrical connection to the sonar elements 160 carried by the carrier 162. In at least one embodiment, the plurality of electrical contact tracks are arranged in concentric circles such that electrical contact is maintained with the sonar elements 160 regardless of the orientation of the rotating carrier 162. Thus, as the rotating carrier 162 rotates, the contacts on the bottom of the rotating carrier 162 are always in contact with the contact tracks of bottom circuit board 168. Control and signal processing circuitry for the sonar elements 160 are included on the circuit boards 168, 170 carried in the pod. In particular embodiments, the signal processing circuitry includes two sonar signal receivers 167 located on opposite sides of the stepper motor 166. The two sonar signal receivers 167 are coupled respectively to the two sonar elements 160 such that each sonar signal receiver 167 receives signals only from one of the two sonar elements 160. In this arrangement, each sonar receiver 167 is dedicated to processing signals from its own sonar element 160. While embodiments of the invention includes systems having only one sonar signal receiver, having two receivers 167 allows for faster signal processing since each receiver 167 is dedicated to its sonar element 160. This also provides even more detail in the sonar image, resulting in more highly resolved sonar images.

Additionally, in a particular embodiment, circuit board 170 includes a microprocessor. The microprocessor is configured to process the return sonar signals and provide subsequent output signals to the control head 110, where the output signals allow the control head 110 to display a variety of sonar images, including those illustrated in FIGS. 7, 8, and 10-17. Including circuitry for processing return sonar signals in the transducer assembly pod also allows the MSS assembly 100 to be used with a variety of fish finders, and does not necessarily require the user to upgrade their control head 110 equipment to take advantage of the features offered by the MSS assembly 100. While not shown in FIG. 19, down scan sonar elements may also be included on the carrier 162. In a particular embodiment of the invention, the pod housing 172 is filled with an acoustic coupling fluid, such that, during operation of the sonar transducer assembly 106, at least some of the electrical components in the pod housing 172 are immersed in the acoustic coupling fluid. In more particular embodiments, the acoustic coupling fluid is oil.

Figure 22:
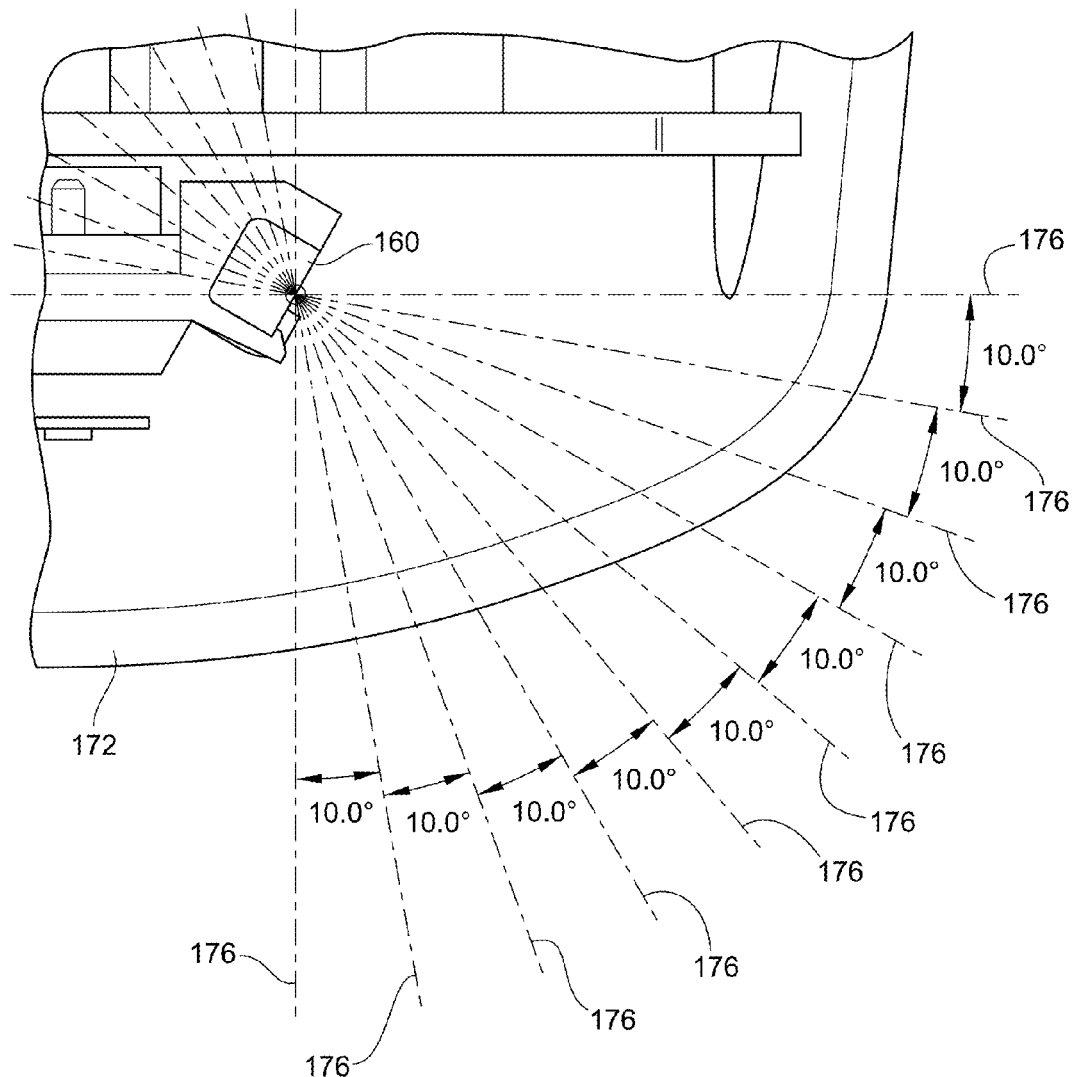
FIG. 22 is a pictorial illustration of the variable wall thickness of the sonar transducer assembly, in accordance with an embodiment of the invention.

In an embodiment of the invention, the sonar transducer assembly 106 includes a variable housing-wall thickness, as shown in FIG. 22 to improve sonar imaging. If an acoustic window is not impedance matched with its surrounding media, the sound waves will refract and reflect within the material based on the angle of incidence at the boundaries of the material. The variable housing-wall thickness is calculated to provide a substantially constant thickness along the ray paths 176 from the sonar elements 160 through the material that limits attenuation and internal reflections. Varying the thickness of the housing wall is necessary because the center of the housing curvature is not coincident with the resonating face of the sonar elements. Matching the acoustic window thickness to multiples of the half wavelength of the incident sound, limits the internal reflections by setting up a resonance within the material, thereby reducing attenuation through the material. In at least one embodiment, the variable housing-wall thickness in the sonar transducer assembly 106 provides a constant window thickness of approximately 0.0128 of an inch in the wide beam plane.

In particular embodiments, the sonar transducer assembly 106 is optimized to operate from the surface of the water. Thus, by properly angling the position of the sonar element(s) 160, the imaging beams typically have a depression angle of 20 to 40 degrees from horizontal. FIG. 22 shows the sonar element 160 angled in such a manner as to direct the sonar beams down into the water. In particular embodiments, the depression angle is 30 degrees. Due to the spread of the beam as it travels away from the sonar element 160, the images returned include the area below the sonar transducer assembly 106, as well as 360-degree views some distance away from the sonar transducer assembly 106. In this manner the MSS assembly 100 provides detailed 360-degree sonar imaging for anglers who find it advantageous to position the sonar transducer assembly 106 at or near the water surface.

Figure 20:
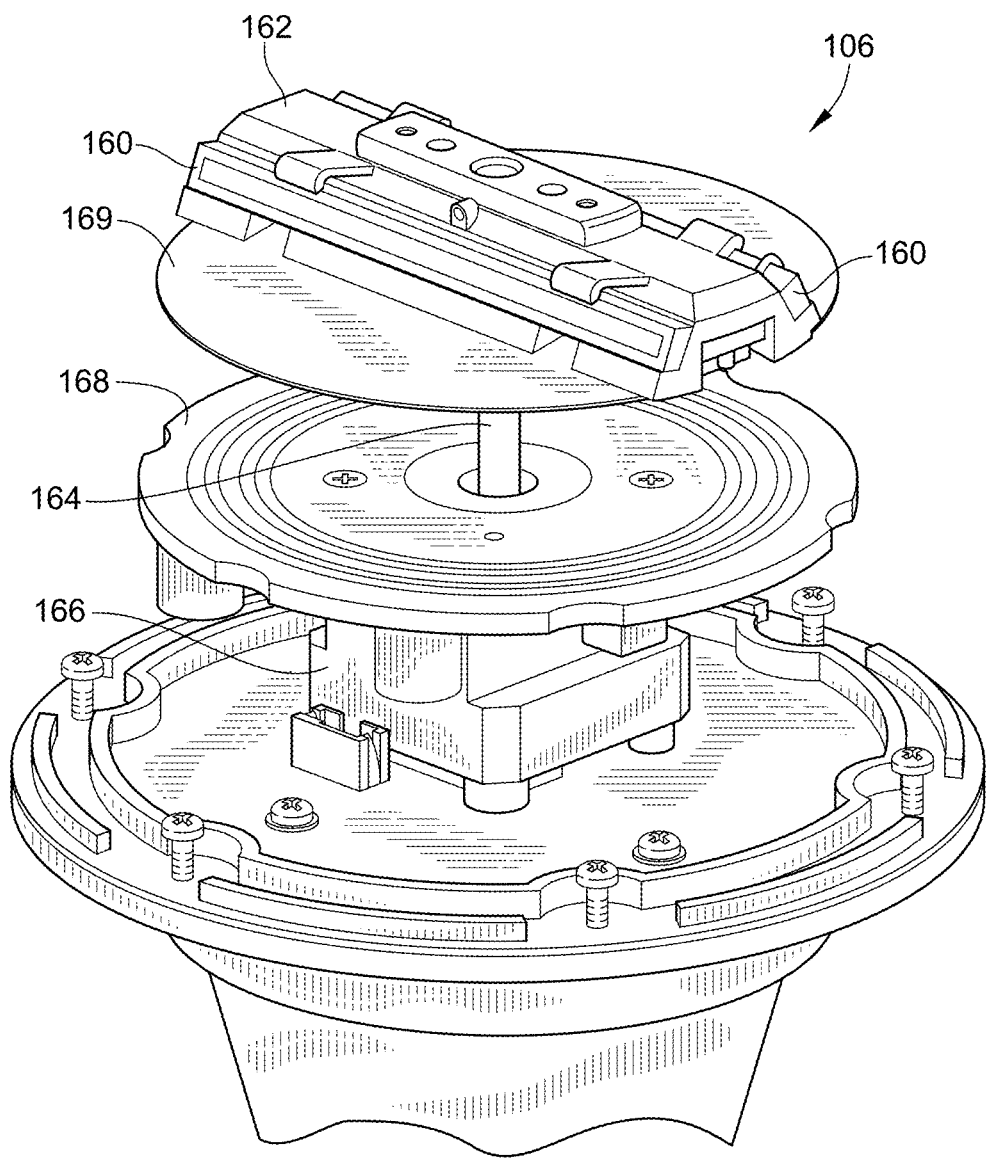
FIG. 20 is an exploded perspective view of the sonar transducer assembly with EM shield, in accordance with an embodiment of the invention.
Figure 21:
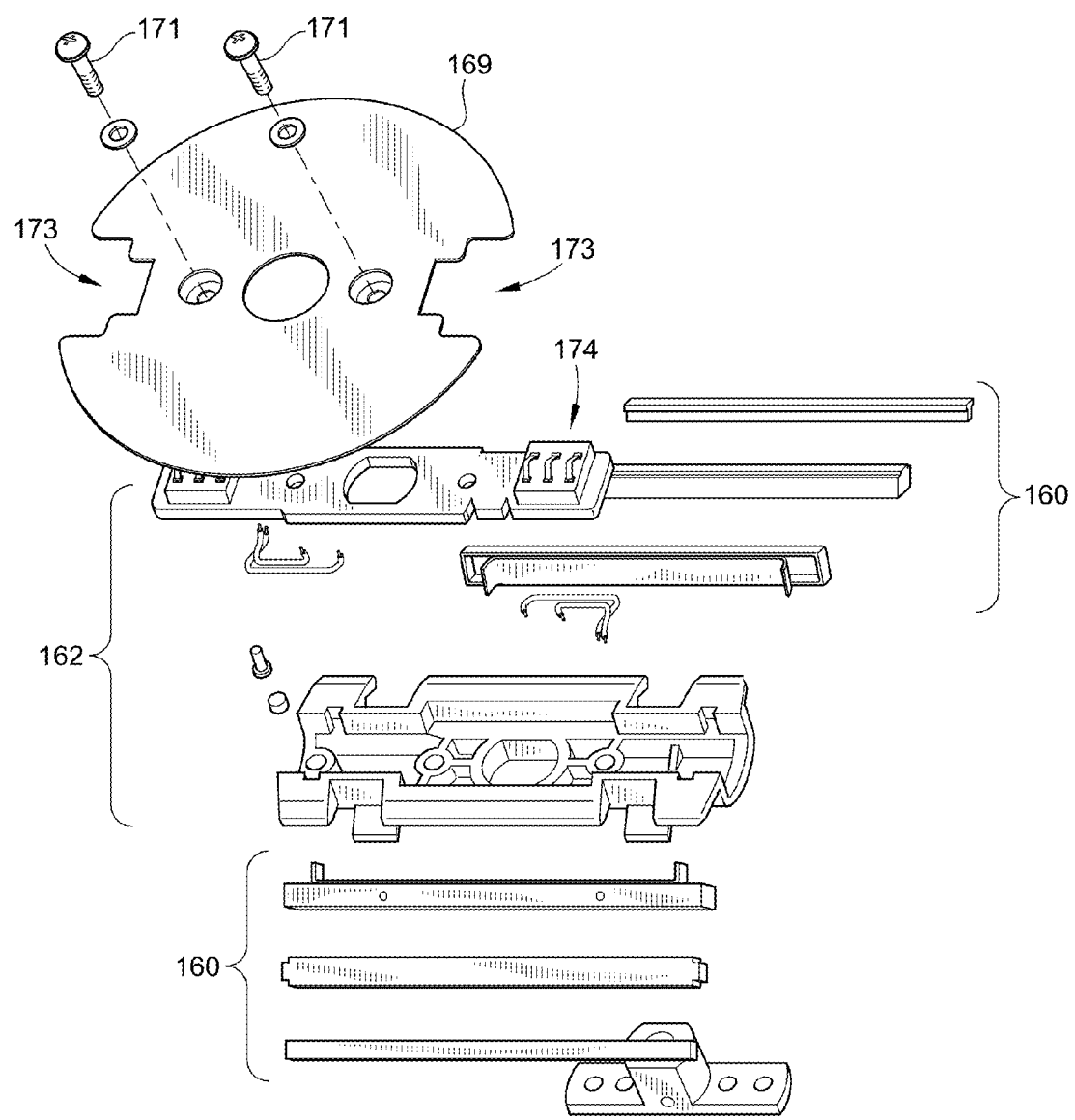
FIG. 21 is an exploded perspective view of a portion of the sonar transducer assembly showing the EM shield attachment to the rotating carrier, according to an embodiment of the invention.

FIGS. 20 and 21 show exploded perspective views of the sonar transducer assembly 106, or portions thereof, including an electromagnetic (EM) shield 169. In the embodiments shown, the EM shield 169 has roughly the same shape as the circuit board 168. The EM shield 169 may be made from circuit board material, such as fiberglass, and may have copper laminate on one side. As can be seen from FIG. 21, the EM shield is designed to attach, using threaded fasteners 171 for example, to the rotating carrier 162 with the copper laminate side facing away from the circuit board 168 when fully assembled. Thus, the EM shield 169 is part of the rotating assembly of the sonar transducer assembly 106, in which the copper is connected to the electrical ground for the rotating assembly. As shown in FIG. 21, the EM shield 169 has two cutout portions 173 which allow electrical contacts 174 on the rotating carrier 162 to contact the electrical contact tracks of bottom circuit board 168.

The EM shield 169 reduces the electromagnetic (EM) noise that can be picked up from typical pulse-width-modulation (PWM) signals used to adjust the speed of the trolling motor. The EM shield 169 also reduces the noise that can be picked up from operation of the spark plugs in the outboard motor. Such noise typically shows up on the sonar image as white dots or lines that can hide or obscure details of the actual sonar image.

In certain embodiments illustrated in FIGS. 1-3 and described below, an MSS assembly 100 can interface with a single control head 110, or network with multiple control heads 110. In particular embodiments, all retract and deploy messages will be broadcast to any control head 110 that has a sonar transducer assembly 106 selected as one of its sonar sources. In particular embodiments, only one speed source will be used to calculate the speed warning thresholds, so that the user does not receive multiple speed warning messages, although other embodiments will allow user selection of this function, while others provide the warning from a plurality of control heads 110.

Figure 18:
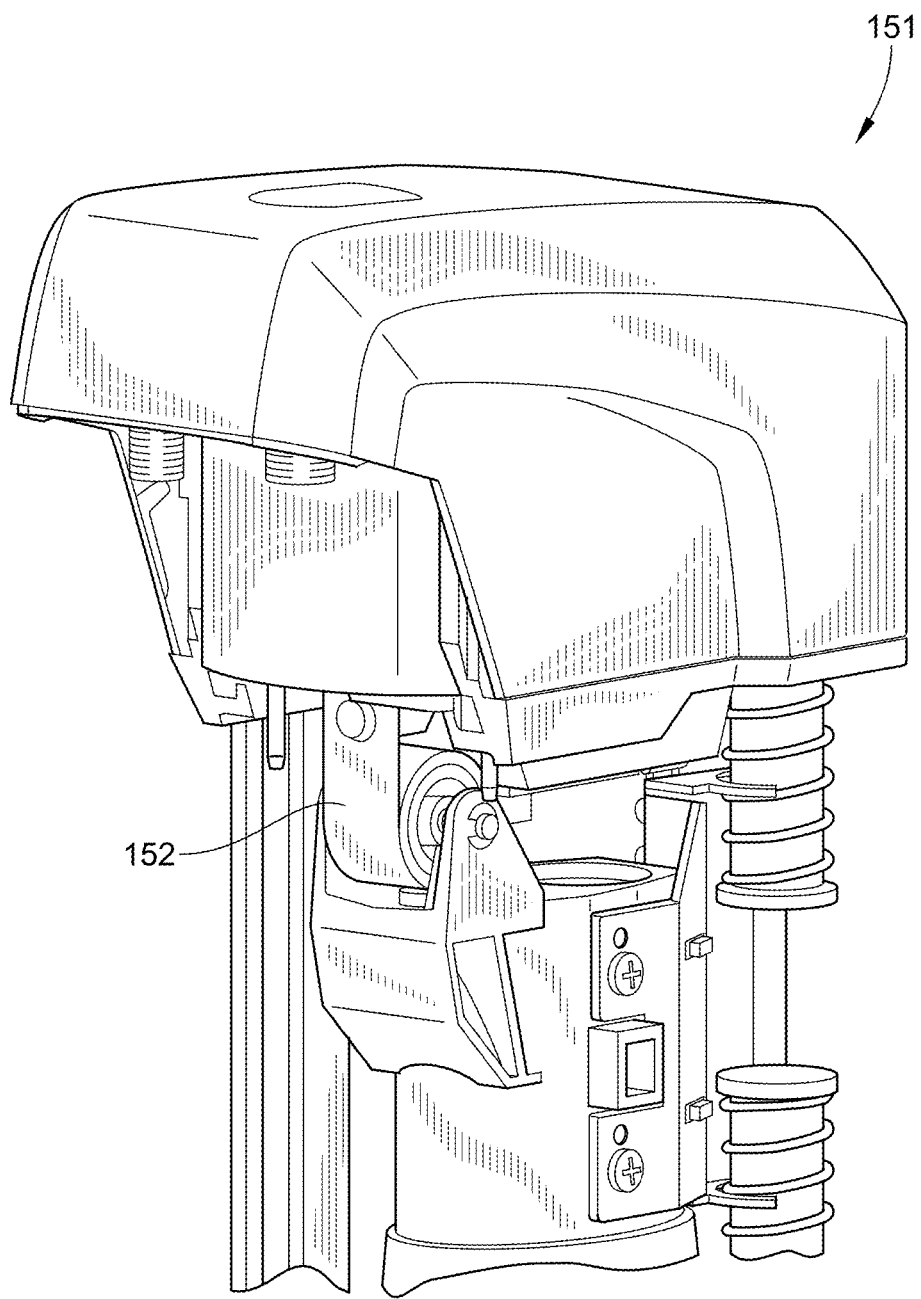
FIG. 18 is a pictorial illustration of an upper control end of the MSS assembly showing user control buttons, and constant force retraction spring features, in accordance with an embodiment of the invention.

FIG. 18 shows a partial cutaway illustration of a drive head 151 for an embodiment of a transom-mounted MSS assembly 100. In the illustrated embodiment, a constant force spring 152 is used in the deployment mechanism to aid in quicker retraction speeds. In at least one embodiment, the constant force spring 152 is a coil of stainless steel, or some other suitable material, situated on a spool, for example, that unrolls like a tape measure, as the sonar transducer assembly 106 is deployed into the water. In one embodiment, it provides sufficient force to counterbalance the weight of the moving assembly, making it easier to retract. The linear actuation system in one embodiment uses a belted system that has a urethane chain driven by a motor to deploy and retract the MSS pod. In certain embodiments, the motor has a rotary encoder allowing the user to monitor and/or maintain the position of the sonar transducer assembly 106. However, other linear actuation systems may be employed in alternate embodiments, such as angled deployment mechanisms. A cowling houses the deployment/retraction motor, and includes the manually actuated buttons on the top thereof. In certain embodiments, the cowling also houses a separate circuit board with the motor controller/driver and communication hardware to communicate with the sonar transducer assembly 106.

Figure 1:
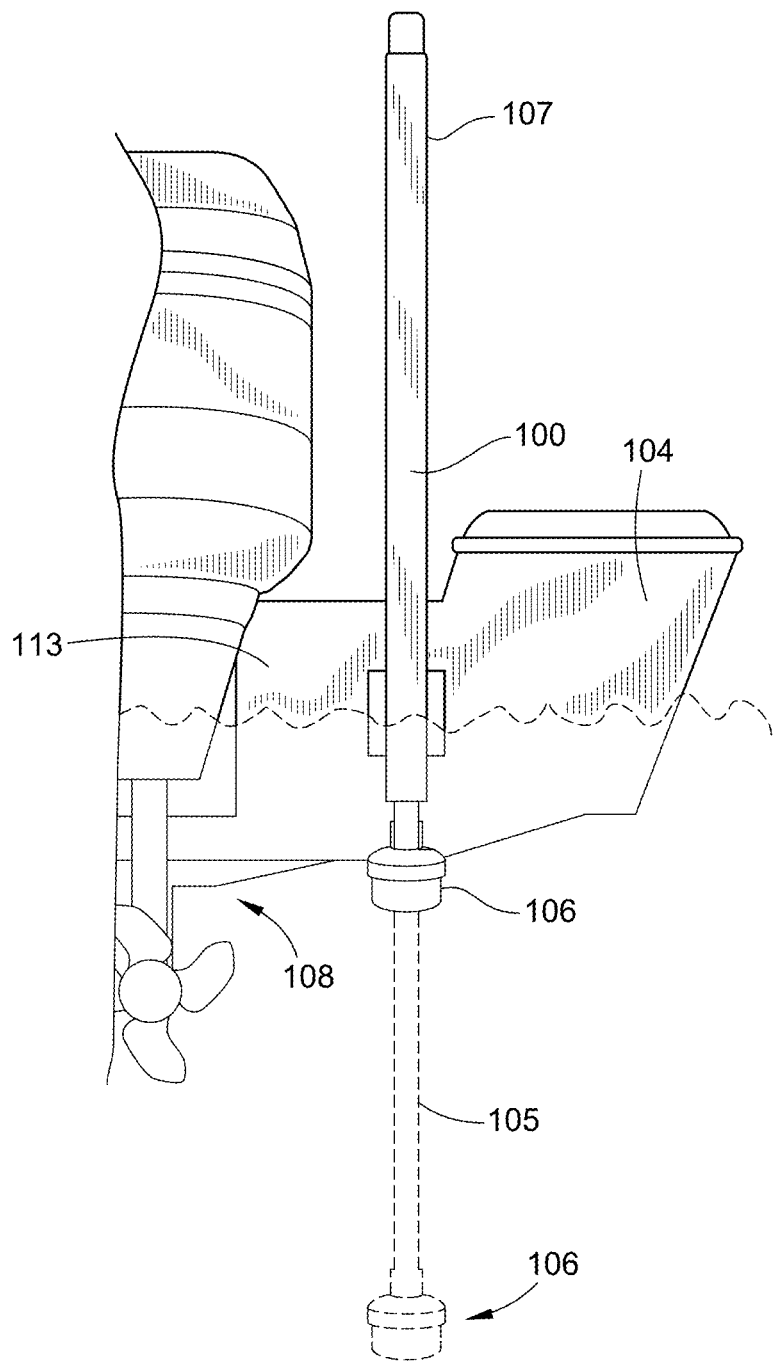
FIG. 1 is a plan view of a boat with a transom-mounted sonar transducer assembly, according to an embodiment of the invention.

FIG. 1 illustrates the MSS assembly 100 deployed from the transom 113 of a fishing boat 104, in accordance with an embodiment of the invention. In FIG. 1, the MSS assembly 100 is shown in its retracted state in which a sonar pod is close to the water line. However, phantom lines are used to show the MSS assembly 100 in its deployed state, in which the sonar pod or sonar transducer assembly 106 is below the keel 108 of the boat 104. As will be explained below, the depth at which the sonar transducer assembly 106 is deployed is adjustable and set by the user. In the embodiment of FIG. 1, the sonar pod or sonar transducer assembly 106 is attached at the end of a shaft 105 that extends from, and retracts into, a housing 107. The interior of shaft 105 provides a path for cables from the sonar transducer assembly 106 to a control head 110 (shown in FIG. 2). The sonar pod or sonar transducer assembly 106 can be deployed in three ways: automatically based on speed; from a 360-degree view; and locally via the buttons on the transducer deployment system, described in detail below. If the sonar transducer assembly 106 is not deployed, all views may be available, but they may not show any data. Also, any changes to the menus will not necessarily affect the screen. Any time the MSS assembly 100 is in the process of deploying, a message will be displayed stating, for example, "Deploying 360 transducer." When the sonar transducer assembly 106 reaches the set depth or the current limit, the deploying message will clear.

Figure 2:
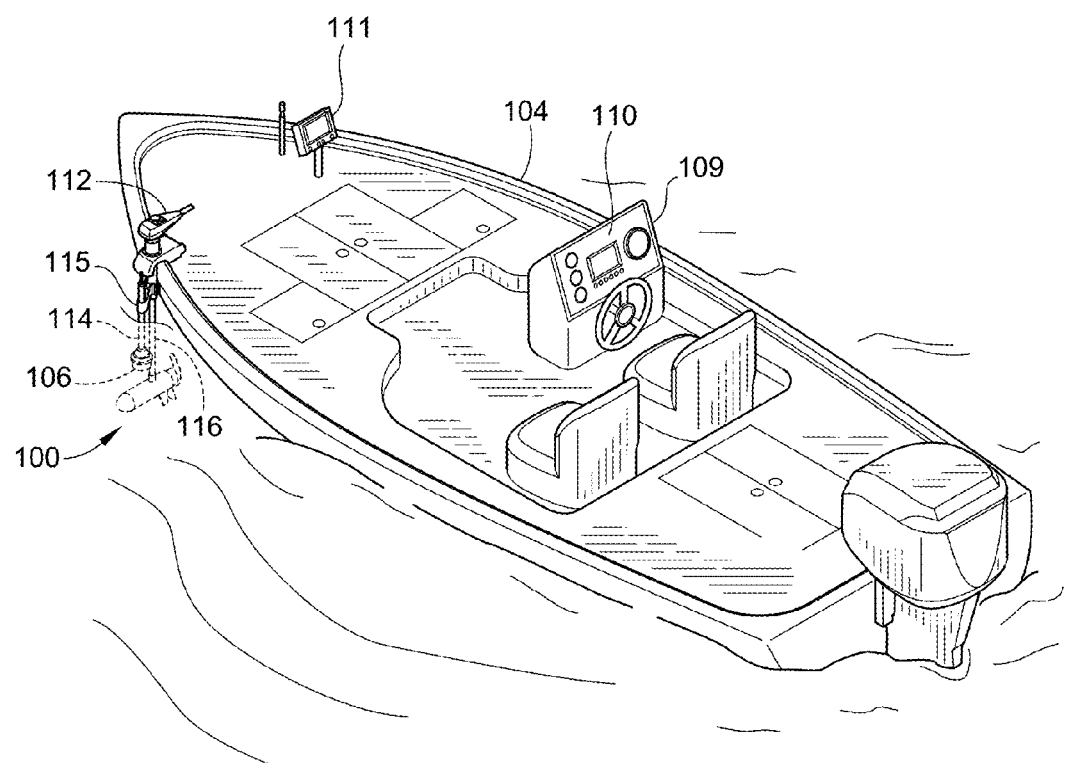
FIG. 2 is a pictorial illustration the sonar transducer assembly attached to a trolling motor, according to an embodiment of the invention.
Figure 3:
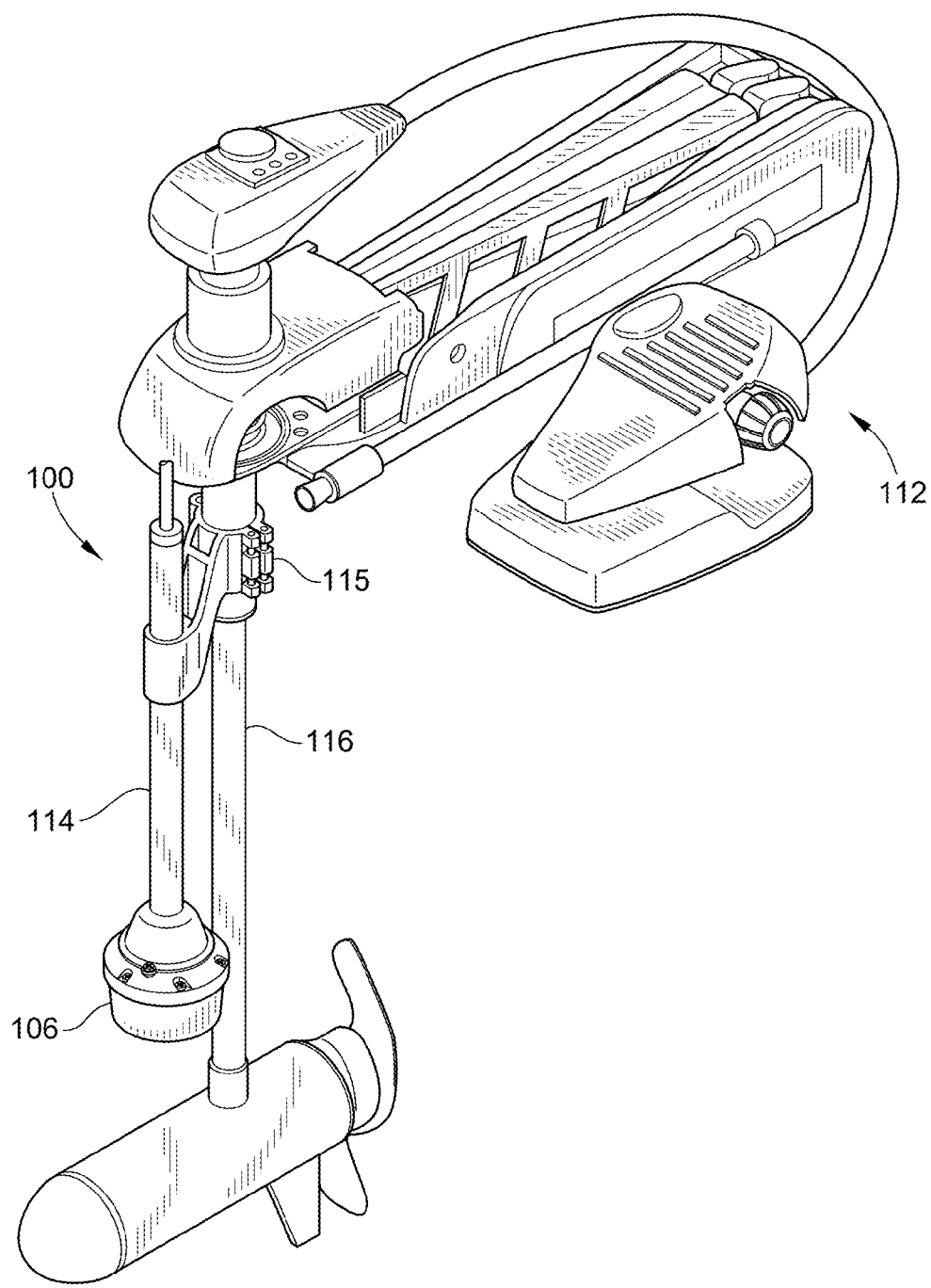
FIG. 3 is a pictorial illustration of the mounting and deployment of the sonar transducer assembly on a trolling motor, according to an embodiment of the invention.

FIG. 2 provides an illustration of the boat 104 having a console 109 with control head 110 that includes a sonar display. It should be noted that in this embodiment, and in those discussed below, the particular method of deployment is such that there is no interference with the normal deployment or refraction of the trolling motor. In the embodiment shown, the MSS assembly 100 is deployed from a bow-mounted trolling motor 112. However, it is conceivable that this embodiment of the invention could be employed in a transom-mounted trolling motor. FIG. 3 shows an isolated view of the MSS assembly 100 attached to the trolling motor 112. The sonar transducer assembly 106 is attached to the end of a shaft 114. The shaft 114 for the sonar transducer assembly 106 is coupled to a non-rotating portion of shaft 116 for the trolling motor 112 by a quick connecting clamp 115. In particular embodiments, the position of the sonar transducer assembly 106 is fixed with respect to the trolling motor 112. That is, the sonar transducer assembly 106 does not rotate with the trolling motor shaft 116, instead remaining stationary with respect to the boat. When deployed, the sonar transducer assembly 106 will preferably be below the keel 108 (shown in FIG. 1) or lowest portion of the boat 104 to allow a full 360-degree view of the underwater environment, as shown in FIG. 2.

Figure 4:
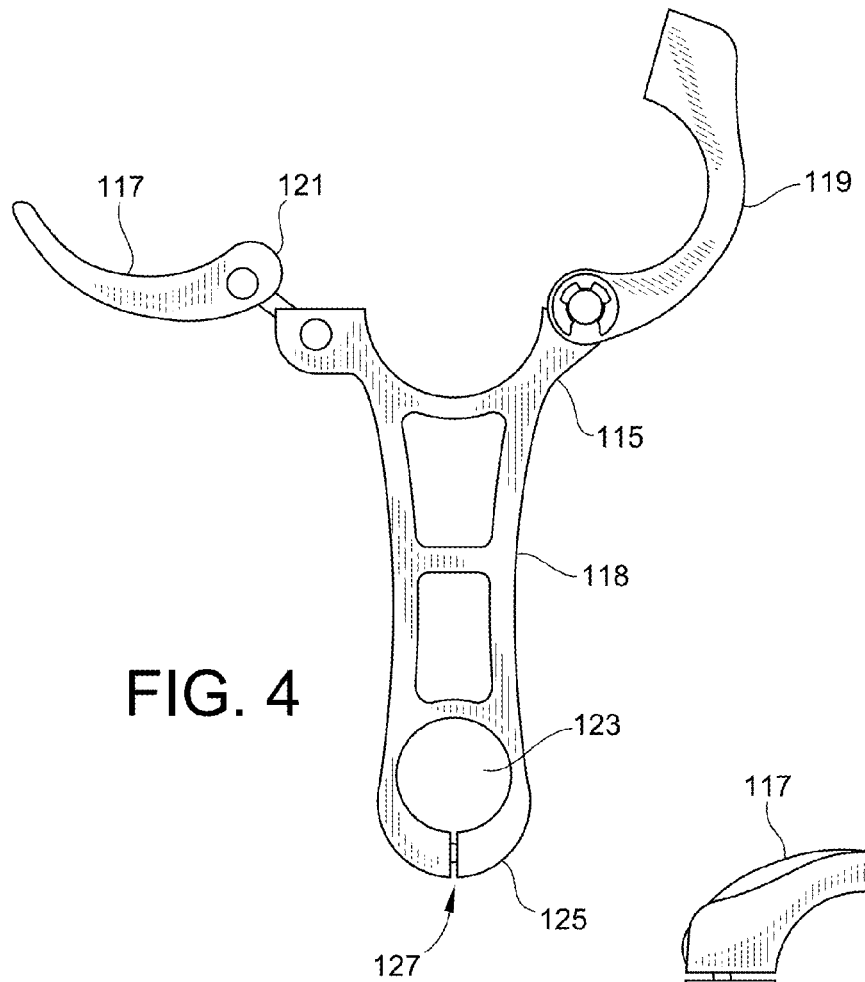
FIG. 4 is a top view of the quick connect clamp shown in FIG. 3 in the open position, according to an embodiment of the invention.
Figure 5:
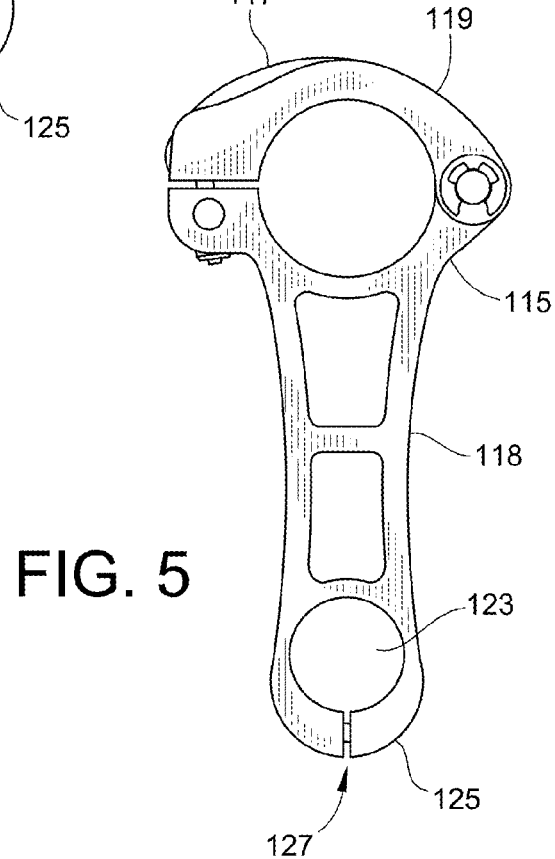
FIG. 5 is a top view of the quick connect clamp shown in FIG. 3 in the closed position, according to an embodiment of the invention.

FIGS. 4 and 5 show a top view of the quick connecting clamp 115 in the open and closed position, respectively. In the embodiment shown, the quick connecting clamp 115 has an elongated body 118 with a pivoting member 119, and a lever 117 with cam 121 at one end of the elongated body 118. The pivoting member 119 is shaped to create an opening, to accommodate a non-rotating portion of the trolling motor shaft 116, when in the closed position. The pivoting member 119 opens for insertion and closes around the non-rotating portion of the trolling motor shaft 116. At the other end of the elongated body is an opening 123 configured to accommodate the shaft 114 for the sonar transducer assembly 106, and an end portion 125 of the clamp 115 surrounding the opening 123. In particular embodiments, the end portion 125 includes a gap 127, which can be expanded or contracted, for example with a threaded fastener, to enlarge or reduce the size of opening 123 to facilitate the assembly process.

In certain embodiments, the quick connecting clamp 115 is an over center cam clamp, meaning that, as the lever 117 passes over the center of its pivot, the lever 117 can be folded down against the pivoting member 119 such that it remains in this position under tension from a rigid member thus holding the quick connecting clamp 115 closed. In this embodiment, the shape of the over center cam 121 defines the actual pivot of the lever 117, in that the pivot hole is not concentric with the rounded outer surface of the cam 121.

The quick connecting clamp 115 allows the user to quickly attach or remove the MSS assembly 100 to or from the trolling motor 112. This feature is useful, for example, if a boat operator is in shallow water where weeds, grass, tree limbs, lily pads stumps, etc. hinder the operation of the sonar transducer assembly 106 or could damage sonar transducer assembly 106. This feature also allows for quick removal of the MSS assembly 100 if the boat operator wants to raise the trolling motor propeller to its shallowest position. The quick removal feature could also help prevent theft of the MSS assembly 100.

Figure 23:
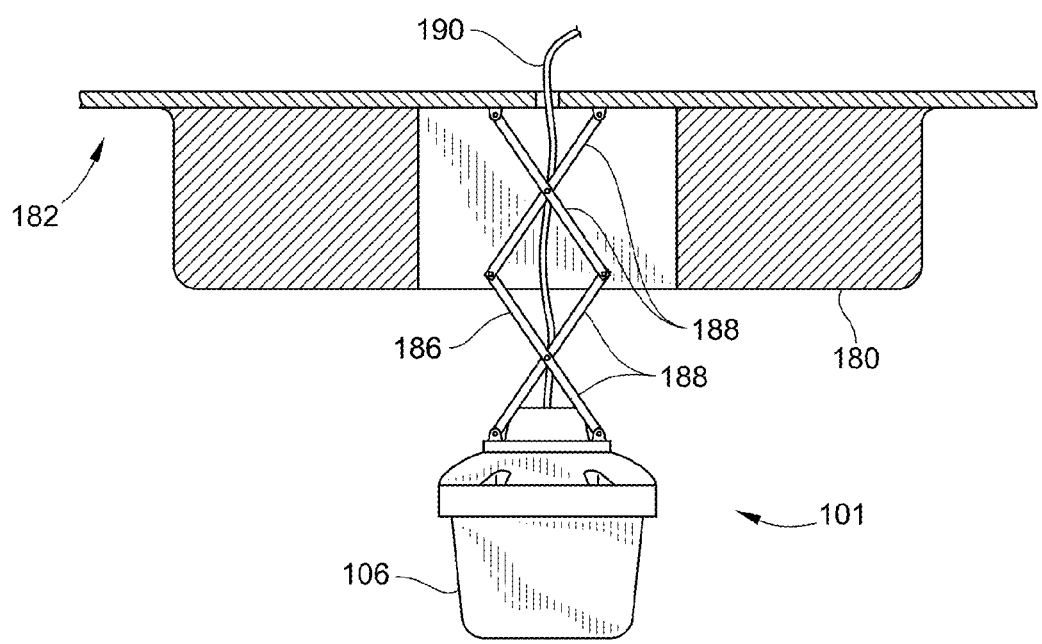
FIG. 23 is a is an illustration showing a particular deployment method for a sonar transducer assembly, in accordance with an embodiment of the invention.

FIG. 23 illustrates a method of deployment for the MSS assembly 101 different from that shown in FIGS. 1-4. In FIG. 23, the deployment mechanism includes a fairing block 180 attached to the hull 182 of a boat 184. The fairing block 180 has a nest or opening designed to accommodate the sonar transducer assembly 106 in its retracted position. As such, the fairing block 180 protectively houses the sonar transducer assembly 106, when retracted, to prevent damage to sonar transducer assembly 106 when the boat 184 is moving at relatively high speed.

FIG. 23 shows the sonar transducer assembly 106 in a deployed position, outside of the fairing block 180. In a particular embodiment, the sonar transducer assembly is deployed and retracted by a scissor lift device 186, which can be extended to deploy the sonar transducer assembly 106 at various distances from the fairing block 180. In certain embodiments, the scissor lift device 186 has four linear members 188 angled with respect to each other. Two of the linear members 188 may be attached to the hull 182 of the boat 184, as shown in FIG. 23. Movement of the linear members 188 operates to extend the sonar transducer assembly 106 down away from the fairing block 180, or up into the fairing block 180 as required, when oriented as shown in FIG. 23. The sonar transducer assembly 106 communicates with the control head 110 (shown in FIG. 2) via cable 190 which, in certain embodiments, passes through the hull 182 of the boat 184 and connects to the control head 110.

Figure 24:
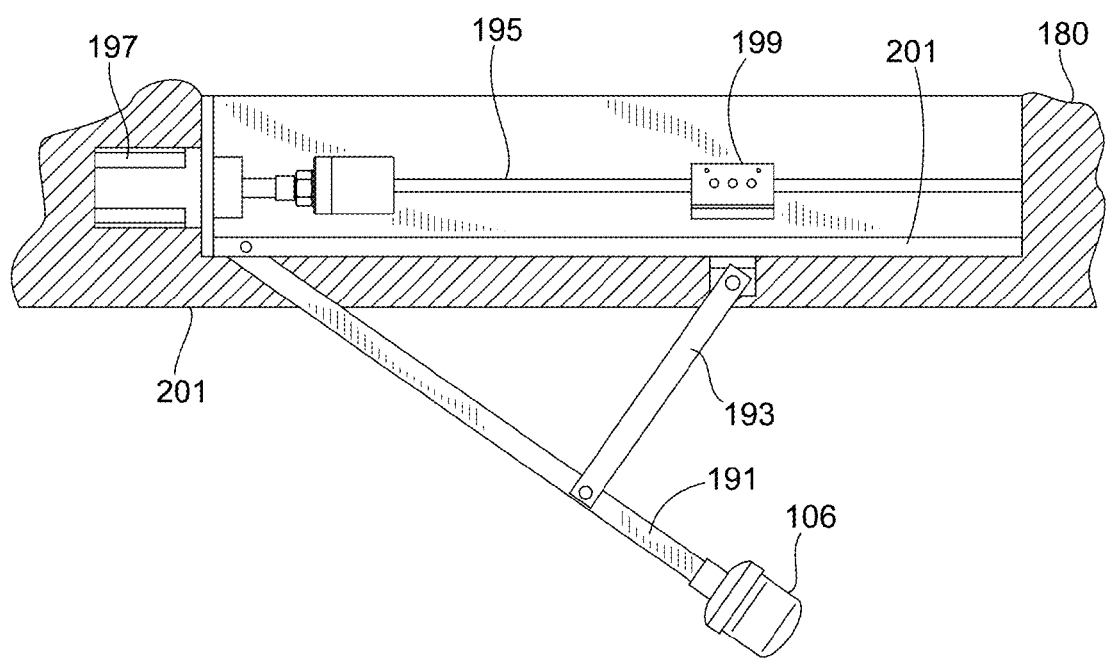
FIG. 24 is a cross sectional view of a sonar transducer assembly with a magnetic breakaway mechanism, according to an embodiment of the invention.

In an alternate embodiment of the invention, the sonar transducer assembly 106 is deployed from within the fairing block 180, as shown in FIG. 24. In this embodiment, the sonar transducer assembly 106 is deployed using a mechanical linkage with a magnetic breakaway. The mechanical linkage includes an articulating rod 191, one end of which is attached to the sonar transducer assembly 106. The other end of the articulating rod 191 is pivotably attached to the fairing block 180.

At a point along the length of the articulating rod 191 between the ends thereof, a connecting rod 193 is attached. In some embodiments, the attachment point is approximately at a midpoint of the articulating rod 191. One end of the connecting rod 193 is pivotably attached to a point along the articulating rod 191, while the other end of the connecting rod 193 is pivotably attached to a track 201 located adjacent to a power screw 195. The power screw 195 is attached to a motor 197 which rotates the power screw 195. Rotation of the power screw 195 is configured to move a magnet 199 back and forth (depending on direction of rotation) along the length of the power screw 195. Movement of the magnet 199 in turn causes movement of that end of the connecting rod 193 pivotably attached to the track 201.

At one extreme, the connecting rod 193 is positioned such that the articulating rod 191 and the connecting rod 193 are housed totally within the fairing block 180, and are substantially parallel with each other and with the adjacent surface of the boat hull. In this configuration, the sonar transducer assembly 106 is fully retracted. To deploy the sonar transducer assembly 106, the motor 197 rotates the power screw 195 moving the magnet 199 and causing the connecting rod 193 to extend down and out from the fairing block. The movement of the connecting rod 193, in turn, cause the articulating rod 191 to extend down from the fairing block 180, thus deploying the sonar transducer assembly 106.

Thus, at a second extreme, the connecting rod 193 is fully extended when the articulating rod 191 extends substantially vertically down from the fairing block 180. Deployed in this manner, the magnet 199 provides a magnetic breakaway mechanism for the sonar transducer assembly 106. In operation, the magnetic breakaway mechanism reduces damage to the sonar transducer assembly 106 in the event that the sonar transducer assembly 106 collides with an underwater object. For example, if the sonar transducer assembly 106 is fully deployed beneath the boat, and movement of the boat causes the sonar transducer assembly 106 to collide with a rock, sunken boat, or other underwater object, the force of the impact causes the connecting rod 193 to break its magnetic connection to the magnet 199 and retract, along with the sonar transducer assembly 106, into the fairing block 180, thus minimizing the damage to the sonar transducer assembly 106.

Figure 25:
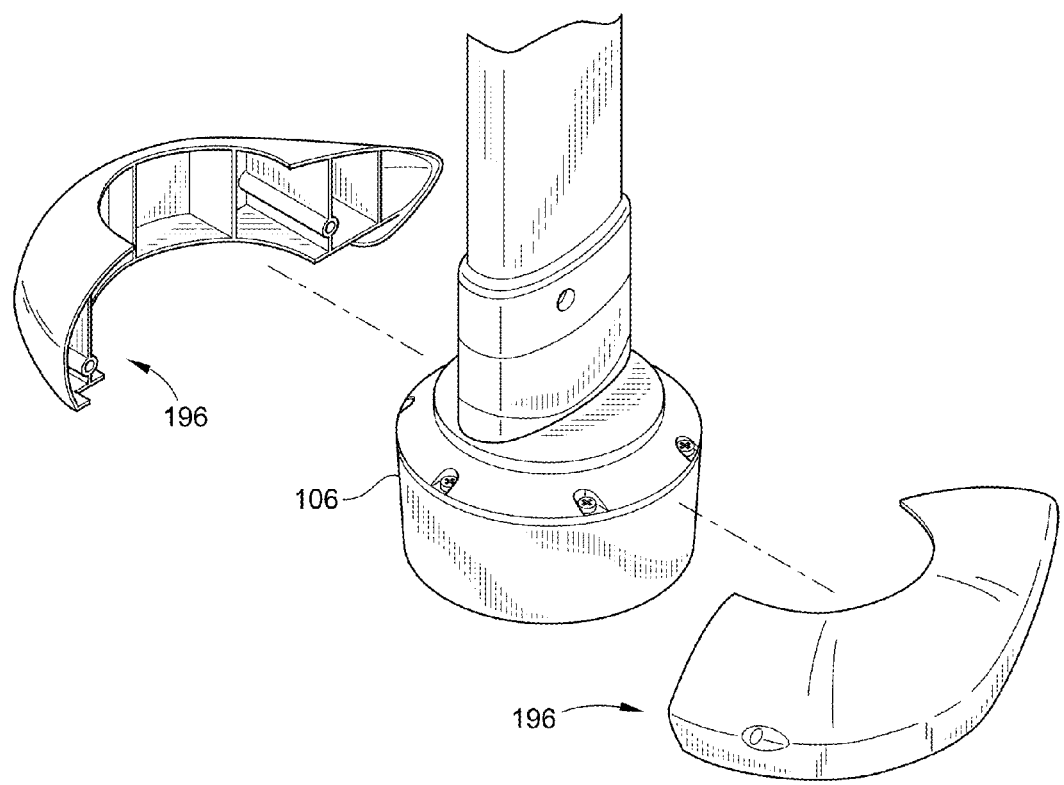
FIG. 25 is a pictorial illustration of the sonar transducer assembly with an outer shell, in accordance with an embodiment of the invention.

FIG. 25 is a pictorial view of the sonar transducer assembly 106 with an outer shell 196. This outer shell 196 is an additional safety feature to protect the sonar transducer assembly 106 in the event that the boat operator forgets that the sonar transducer assembly 106 is deployed and accelerates the boat 184. The outer shell 196 can be advantageously employed with the deployment mechanisms shown in FIGS. 23 and 24, as well as a range of other deployment mechanisms. In a particular embodiment of the invention, the outer shell 196 is designed as a lifting body, similar to an airplane wing. In addition to its hydrodynamic shape, which reduces the drag exerted by the water on the outer shell 196 and sonar transducer assembly 106, the lifting body shape of the outer shell 196 results in an upward force on the outer shell 196 and sonar transducer assembly 106, as the boat 184 moves through the water. For example, should the boat operator accelerate the boat while the sonar transducer assembly 106 is deployed, that upward force would cause the outer shell 196 and sonar transducer assembly 106 to retract upward, perhaps on the scissor lift device 186, until the outer shell 196 and sonar transducer assembly 106 are safely within the nest of the fairing block 190. In the embodiment of FIG. 25, the outer shell 186 is made from two halve assembled around the sonar transducer assembly 106.

Figure 26:
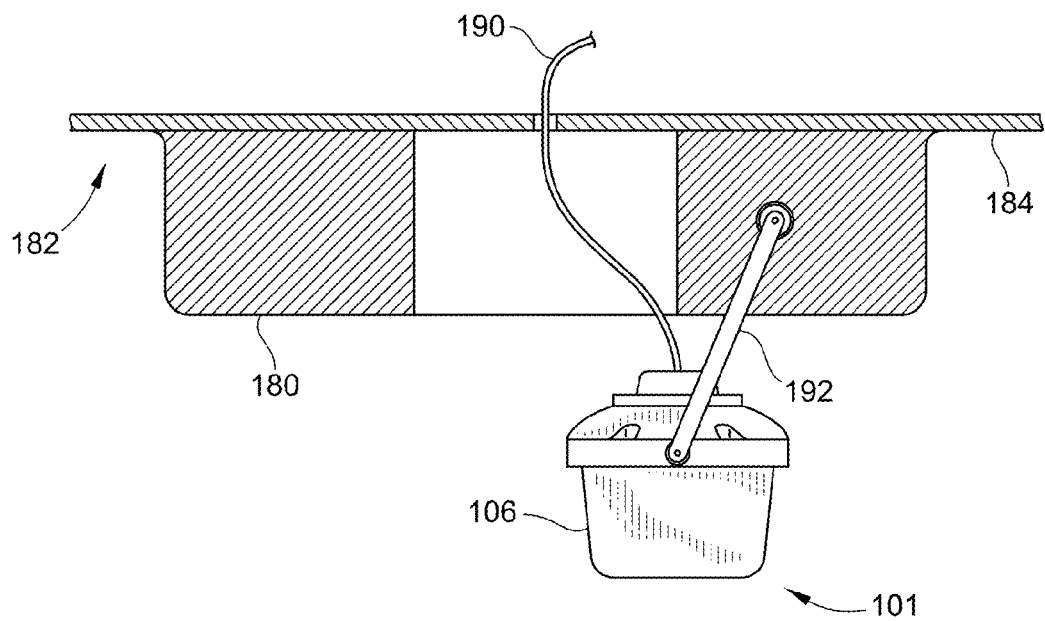
FIG. 26 is an illustration showing a deployment method for the sonar transducer assembly different from that in FIG. 19, in accordance with an embodiment of the invention.

An alternate method of deploying the MSS assembly 101 is illustrated in FIG. 26, which includes the sonar transducer assembly 106 and shows a deployment mechanism that includes the fairing block 180 attached to the hull 182 of the boat 184, and the cable connecting the sonar transducer assembly 106 to the control head 110 (shown in FIG. 2) aboard the boat 184. In the embodiment of FIG. 26, the sonar transducer assembly 106 is deployed and retracted via a pair of parallel swing arms 192. When the sonar transducer assembly 106 is in the retracted position, the parallel swing arms 192 are substantially horizontal, when oriented as shown in FIG. 26. When the sonar transducer assembly 106 is deployed, the parallel swing arms 192 swing down from the horizontal towards the vertical.

As with the scissor lift device 186 described above, the deployment distance below the fairing block 180 is variable depending on the extent to which the parallel swing arms 192 swing towards the vertical position. Further, when deployed, the sonar transducer assembly 106 swings down below the fairing block 180 in a direction from the rear of the boat 184 towards the front of the boat 184. By configuring the parallel swing arms 192 to swing down in this direction, any forward motion of the boat 184 tends to urge the sonar transducer assembly 106 towards the retracted position inside of the fairing block 180. This is a safety feature to protect the sonar transducer assembly 106 in the event that the boat operator forgets that the sonar transducer assembly 106 is deployed and accelerates the boat 184. As the speed of the boat 184 increases, the force of the water on the sonar transducer assembly 106 forces the sonar transducer assembly 106 back and up into the fairing block 180.

Figure 27:
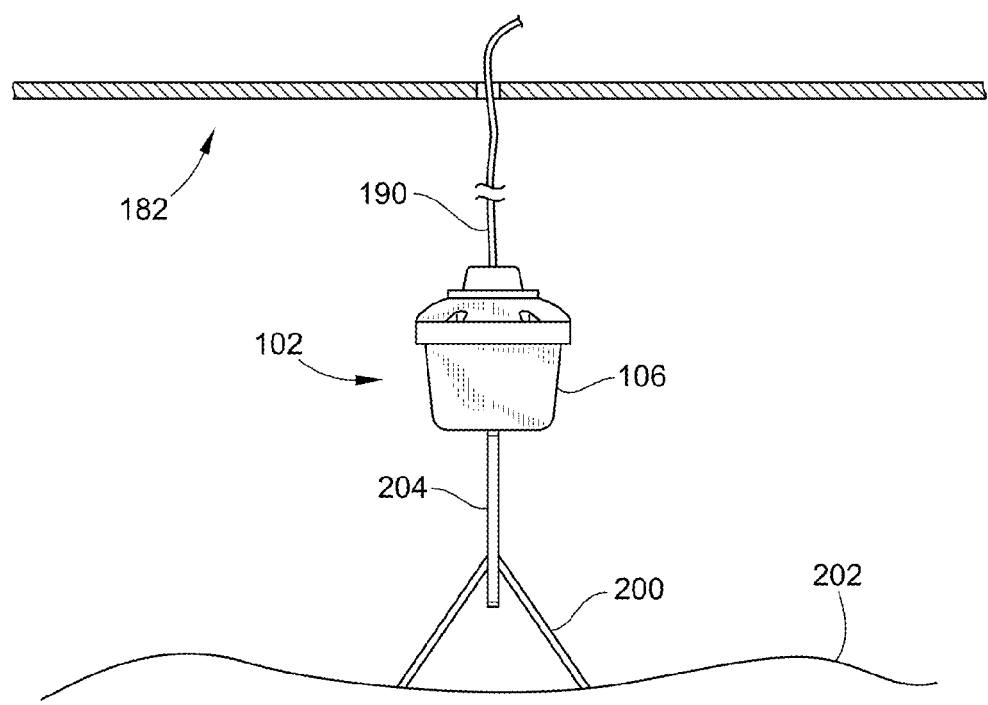
FIG. 27 is an illustration showing a deployment method for the sonar transducer assembly usable in search and rescue operations, in accordance with an embodiment of the invention.

FIG. 27 illustrates a method of deployment for the MSS assembly 102 with potential use in search and rescue, or even salvage, operations. As illustrated in FIG. 27, the MSS assembly 102 includes the sonar transducer assembly 106 that is supported by a tripod assembly 200 designed to rest on the bed 202 of a body of water. The tripod assembly 200 includes a vertical support shaft 204 with the sonar transducer assembly 106 attached to an upper end thereof. The cable 190 connects the sonar transducer assembly 106 to the control head 110 aboard the boat 104. This allows the boat operator to control operation of the sonar transducer assembly 106 and view the sonar images provided by the sonar transducer assembly 106.

In a search and rescue or salvage operation where visibility in the water is low or non-existent, divers can be guided to a particular location of interest by a boat operator using the MSS assembly 102. In these situations, the MSS assembly 102 may be deployed to the bed 202 of a body of water using a robotic or autonomous vehicle to properly locate the tripod assembly 200 or from a stabilizing buoy at or near the surface of the body of water. In a particular embodiment, there is a flexible link between the buoy and the sonar transducer assembly 106. The flexible link acts to decouple the sonar transducer assembly 106 from the wave action on the surface of the water.

As an example, the boat operator may commence generating a 360-degree image of the surrounding area in an attempt to locate the object of interest in the search and rescue operation. Because the 360-degree image can show the boat operator the location of the rescue divers as well, the operator can verbally communicate with the divers via radio or intercom to relay directions guiding the rescue divers to the object of interest.

Figure 28:
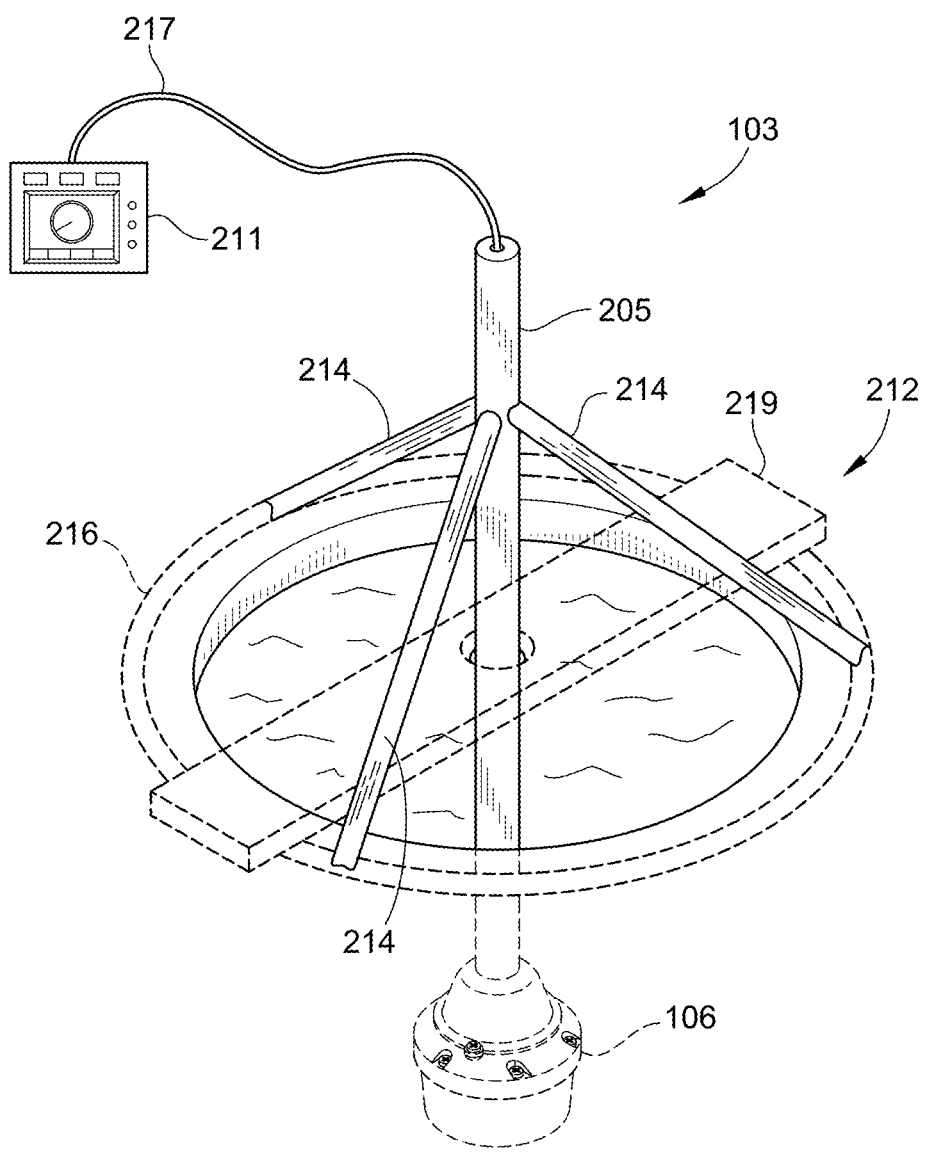
FIG. 28 is an illustration showing a deployment method for the sonar transducer assembly usable in ice fishing applications, in accordance with an embodiment of the invention.

FIG. 28 illustrates a method of deployment for the MSS assembly 103 with potential use in ice fishing. In a particular embodiment, the MSS assembly 103 includes a shaft 205 with the sonar transducer assembly 106 attached to one end of the shaft 205. A control head and a portable display 211 are attached via cable 217 to the other end of the shaft 205. The MSS assembly 103 also includes a stabilizing member 212. In operation, the sonar transducer assembly 106 is placed through a hole in the ice covering a body of water. The stabilizing member 212 is configured to support the shaft 205 and sonar transducer assembly 106 in a stable position. In a particular embodiment, the stabilizing member 212 is a set of three or more rigid poles 214, which may be retractable, each angled radially outward and downward from their respective points of connection to the shaft 205. The set of rigid poles 214 rest on the ice surrounding the hole.

In alternate embodiments, the stabilizing member 212 may include a ring assembly 216 (shown in phantom) connected to the shaft 205 via the set of rigid poles 214, or by some other suitable means of connection. The ring 216 may rest on the ice surrounding the hole. The stabilizing member 212 is configured to reduce movement of the MSS assembly 103, while an ice fishermen views a 360-degree sonar image on the portable display 211 to determine when a fish is underneath the hole in the ice. In a particular embodiment, the stabilizing member 212 may be a plank stabilizer 219 (shown in phantom) configured to span the width of an ice fishing hole and rest on the ice, as shown in FIG. 28.

In a particular embodiment, the MSS assembly 103 is designed to have neutral buoyancy when partially submerged as shown in FIG. 28. In a more particular embodiment, the location of stabilizing member 212 on the shaft 205 may be adjustable, however, the stabilizing member 212 would typically be placed such that the buoyancy of the MSS assembly 103 would not cause the stabilizing member 212 to hover above the ice.

In embodiments of the invention, setting the deployment depth is a user function. The sonar transducer assembly 106 deployment depth is a user-set value which is controlled via a menu entry entitled, "360 Depth." In an embodiment of the invention, this menu is in the Sonar Main menu above the Auto Deploy menu. In a particular embodiment, the deploy depth values range from 0 to 100, where each step is 0.30 inches. If the sonar transducer assembly 106 is in a retracted state, it will not move until the user deploys it. If the sonar transducer assembly 106 is already deployed, it will move as the user adjusts the menu. If the sonar transducer assembly 106 is also pinging (that is, transmitting sound waves into the water), it will continue to ping while adjustments are being made. In a particular embodiment, the default value is 1. If the user adjusts the underwater depth sonar transducer assembly 106 at the motor via a button or switch allowing such control, the 360 Depth menu item will update to show the new depth. While being deployed, the sonar transducer assembly 106 will slow its descent as it reaches the set depth so that it does not come to a hard stop at the set depth. If the sonar transducer assembly 106 stops, due to hitting a current limit before the desired depth is reached, the depth menu will not update, and the sonar transducer assembly 106 will attempt to reach that depth after the sonar transducer assembly 106 is retracted and re-deployed. In an alternate embodiment, a rotary encoder located on a gear motor indicates that the sonar transducer assembly 106 has stopped before the desired depth is reached, the depth menu will not update, and the sonar transducer assembly 106 will attempt to reach that depth after the sonar transducer assembly 106 is retracted and re-deployed.

A particular method of deployment involves deploying the sonar transducer assembly 106 via MSS Full or Combo View from the control head. When the user switches to a 360-degree view while the sonar transducer assembly 106 is retracted, a message box will come up centered on the MSS view stating, for example, "360 sonar unit is retracted. Deploy 360 transducer?". In particular embodiments, if the user selects "Yes", the sonar transducer assembly 106 will deploy to the depth set in the 360 Depth Menu. If the user gives no response, the sonar transducer assembly 106 will not deploy, but the message will not clear itself from the screen. The message will remain on screen, centered on the MSS display area until the view is changed. In at least one embodiment, when using Combo Views, this message will be centered on the MSS side of the view, not the whole view. In certain embodiments, this can only be answered if the user has the Combo side set to active. However, alternate layouts are available in other embodiments of the invention.

In a further embodiment, an Auto Deploy-Sonar Main Menu is included. This menu is added to the Sonar Main Menu once the sonar transducer assembly 106 is detected on the Ethernet network. The Auto Deploy feature deploys the sonar transducer assembly 106 into the water when the boat 104 is moving at or below a user specified speed. Data is preferably dampened so that Auto Deploy activates for actual depth changes and not quick spikes. This will be similar to the auto range algorithm for auto depth. A paddle wheel speed sensor is the preferred speed source. GPS speed is used if there is no paddle wheel sensor attached. If there is no way to ascertain boat speed, this menu is not available. In at least one embodiment, the available range is Off-9 mph, wherein the default=Off.

In certain embodiments, when the deployment threshold is met, the unit will sound an alert and display a message, such as "Deploy 360 Sonar?". If the user selects "Yes", the sonar transducer assembly 106 will deploy to the depth set in the 360 Depth menu. If the user selects "No", or gives no response for 30 seconds, the sonar transducer assembly 106 will not deploy and the message will clear itself from the screen. If the user does not select "Yes", the sonar transducer assembly 106 will reset the test flag so that the user will have to speed up passed the threshold and slow down again before the message will return.

Figure 6:
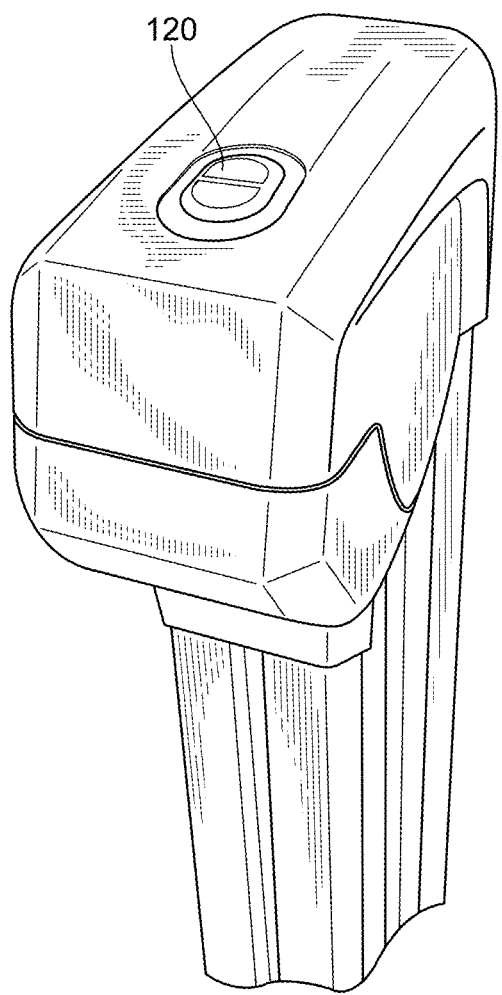
FIG. 6 is a pictorial illustration of the system for local control of the deployment or retraction of the transom-mounted sonar transducer assembly, according to an embodiment of the invention.

In a preferred embodiment, the sonar transducer assembly 106 may also be deployed locally via a button or switch allowing local control. With the transom mounted MSS assembly 100 shown in FIG. 1, the user can deploy or retract the sonar transducer assembly 106 using a switch or push button 120 on a top portion of the MSS assembly 100, as shown in FIG. 6. In certain embodiments, when this happens, the user interface recognizes that the sonar transducer assembly 106 has been deployed and begins pinging as appropriate. The user interface also updates the 360 Depth Menu to match the current sonar transducer assembly 106 deployment depth. The user can press and hold the button 120 on the housing and deploy the sonar transducer assembly 106 smoothly to the desired height, at which time the button 120 can be released. Alternatively, the user can press the button 120 and release quickly, or tap the button 120, to drop the unit by a fixed amount, e.g., 0.25 of an inch, on each press. A button to manually deploy and retract the sonar transducer assembly 106 is not needed when the MSS assembly 100 is attached to the trolling motor 112 as shown in FIG. 3

In at least one embodiment, the user is also able to remotely deploy the sonar transducer assembly 106 via the main menu. A menu named "Deploy 360 Sonar" is included in the Sonar Main Menu when a sonar transducer assembly 106 is detected by the control head 110, via an Ethernet connection for example. This option is always available whether the sonar transducer assembly 106 is deployed or not. Selecting this option with the arrow key on the control head 110 begins moving the sonar transducer assembly 106 to the depth set in the 360 Depth Menu.

The following describes a method of using a particular embodiment of the 360-degree sonar imaging system. When the sonar transducer assembly 106 is deployed, all sonar displays of the 360-degree sonar imaging system will show the data from the sonar transducer assembly 106. When an MSS view is being viewed, the sonar source selected in the Sonar Source 2-D menu will continue to ping on its downward-looking beams. This information will be used for depth determination, and will build a downward-looking sonar history. The side imaging beams will not be pinged. If the user switches the view to a non-sonar view (e.g., birds eye, chart, weather, etc.), the last transducer used will continue to ping.

The sonar transducer assembly 106 can be retracted in any one of five ways: 1) through a warning based on speed; 2) automatically when a control head(s) is disconnected; 3) from a 360-degree view; 4) via the Main Menu; and 5) locally. The sonar transducer assembly 106 is considered retracted when it is lifted as far up into the housing 107 as possible, at which point it will stop based on resistance, or due to having hit the zero position. In certain embodiments, zero position is monitored by either the rotary encoder attached to the motor, or by a Hall Effect sensor built into the deployment system.

In one embodiment, a speed warning is provided when the speed of the boat 104 is so great that some part of the MSS assembly 100 could be damaged due to deployment of the sonar transducer assembly 106. A speed warning may also be provided when a command to deploy the sonar transducer assembly 106 cannot be follow due to the speed of the boat 104. In a particular embodiment, the menu "360 Speed" is added to the Alarms Main Menu once the sonar transducer assembly 106 is detected by the control head 110, on a Wi-Fi or Ethernet network for example. Setting this alarm causes the MSS assembly 100 to track the boat's speed, and puts up a warning when the boat 104 exceeds the user selected speed. In particular embodiments, the speed warning provides a confirmation message saying, for example, "360 Speed Alarm has been reached. Retract 360 Sonar?" Two options are given: 1) "Yes"—Retracts the sonar transducer assembly 106 which is broadcast across the network; and 2) "No"—Leaves the sonar transducer assembly 106 in the water and does not re-sound until the threshold has been cleared by going slow and then re-flagged by speeding up again. In this case, "Exit" may not be a valid input. If any unit on the network clears the message, all units should receive the input. The paddle wheel speed sensor is the preferred speed source. GPS speed is only used if a speed sensor, for example, a paddle wheel speed sensor is not attached. If no speed measurement is available, this menu is not available. Typically, if the boat speed was previously available and then goes offline, a message will be displayed, "No Speed found. The 360 Speed Alarm will not sound." The available range is Off-10 mph in one embodiment. There is no Auto Retract feature based on speed in one embodiment, while in another embodiment, there is an Auto Retract feature.

According to a particular embodiment, if there are multiple control heads 110 on the boat 104, when all control heads 110, that are set to use the 360-degree sonar imaging system on the network, power down via the power button, the sonar transducer assembly 106 will automatically retract. The MSS assembly 100 will detect if all control heads 110 are no longer online and retract after 30 seconds of lost communication. If no control head 110 is set to use the sonar transducer assembly 106 as a source, the sonar transducer assembly 106 will automatically retract. However, in some embodiments, the sonar transducer assembly 106 will not retract when at least one control heads 110 with the sonar transducer assembly 106 selected, even if the 360 view is not selected.

In certain embodiments, the sonar transducer assembly 106 can retract via the Xpress Menu. The retract feature lets users remotely retract the sonar transducer assembly 106 via the control head 110 without meeting any thresholds. The user can retract the sonar transducer assembly 106 via the Xpress menu on any 360 view when the MSS is deployed. All control heads 110 on the network will be notified that the sonar transducer assembly 106 is retracted.

In another embodiment of the invention, the sonar transducer assembly 106 can retract via the Main Menu. For example, a menu named "Retract 360 Sonar" is added to the Sonar Main Menu when a sonar transducer assembly 106 is detected via the Ethernet connection. This option is always available whether the unit is deployed or not. Selecting this option with the right arrow key begins moving the MSS unit. All control heads 110 on the network will be notified that the sonar transducer assembly 106 is retracted.

In another embodiment of the invention, the sonar transducer assembly 106 can retract manually. The user can also retract the sonar transducer assembly 106 using a switch 120 or hand crank on the MSS assembly 100. When this happens, the control head 110 receives a message, indicating that the sonar transducer assembly 106 has been retracted fully or partially, and update the menus accordingly. The user can press and hold the button 120 on the housing 107 (shown in FIG. 3) and raise the sonar transducer assembly 106 smoothly to the desired height. Alternatively, the user can press and release the button 120 quickly to raise the unit by a fixed amount, e.g., 0.25 of an inch, on each press.

A plurality of features is associated with the sonar transducer assembly 106. Some are part of the main menu system and others are onscreen features as listed below. Some menu settings are synchronized across the network. Any menu settings that are not networked do not need to be synchronized with other control heads 110 sharing the sonar transducer assembly 106.

According to certain embodiments, in the onscreen menus, the following features are available: Zoom; Cursor; and Quick Sweep Area (networked). The 360 Colors menu may offer the same colors as the SI colors, and they will be applied in the same way. The 360 Boat Icon menu allows the user to turn the boat icon on and off in 360-degree views. In certain embodiments, the default is "On". The 360 Range Overlay menu allows the user to turn the bearing scale and range lines on and off for 360-degree views. In certain embodiments, the default is "On".

Figure 7:
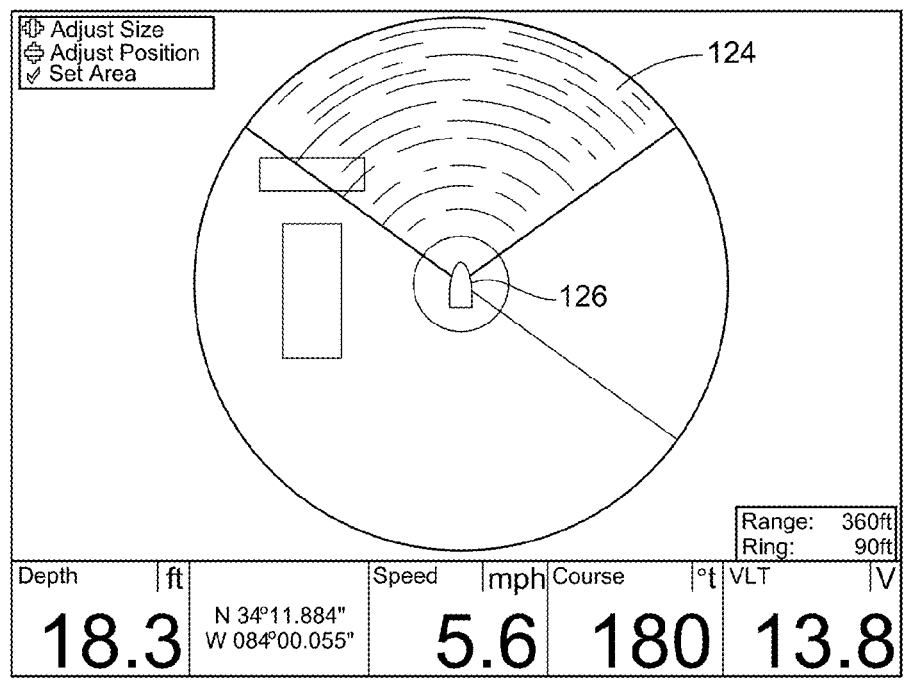
FIG. 7 is a screen shot illustration of an exemplary 360-degree display of the Isolate Sweep Area function, according to an embodiment of the invention.

The MSS assembly 100 also provides an "Isolate Sweep Area" feature. FIGS. 6 and 7 illustrate exemplary screen shots of the control head display showing a display of the Isolate Sweep Area function, which is also referred to as a Sector Scan function. To focus the sweep on a particular area, or sector scan, 124, the user can turn on "Isolate Sweep Area" in the Xpress Menu. The Isolate Sweep Area dialogue box appears with directions on how to adjust the sweep area 124 with the directional pad. While the user is setting the sweep area 124, which is an angled sonar image typically of less than 360 degrees, the sonar transducer assembly 106 will stop sweeping to help aid with the overall response and performance of the device. The angled sonar image, or highlighted area 124, may be configured to show a sector scan having a default angle the first time the feature is used. After that, the highlighted area is the last angle for the isolated sweep area selected by the user. In a particular embodiment of the invention, the default angle is a 100-degree angle directly in front of the boat.

According to a particular embodiment, the user adjusts the view using the arrow keys. Left/Right keys move the area clockwise and counter-clockwise. Up/Down keys increase and decrease the angle. All of the arrow keys will have an acceleration feature so that the user can press and hold the button to move faster. The desired isolated sweep area remains normal and the rejected area is shaded, but still visible under the shading. In one example, to set, or retain, the current sweep area, the user presses the "Enter" (check/info) key. To cancel setting the isolated area, the user presses the "Exit" key, for example.

Figure 8:
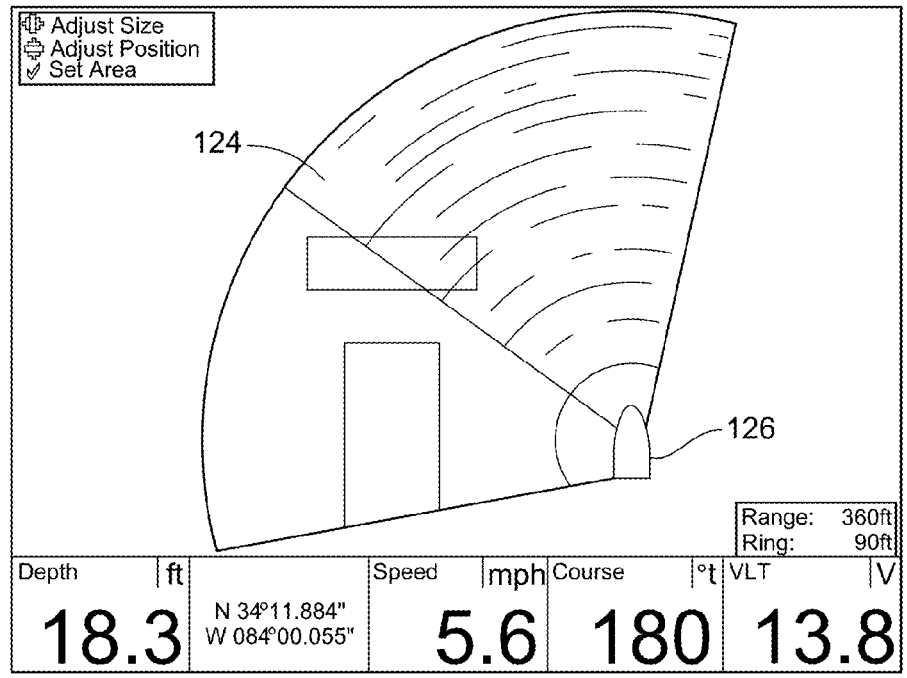
FIG. 8 is a screen shot illustration of an exemplary 360-degree display of the Isolate Sweep Area showing a user-selected area in accordance with an embodiment of the invention.

Once the sweep area is set, the area outside the sweep is not displayed. In a particular embodiment, the minimum allowable angle that can be set with Isolate Sweep Area is 10 degrees. In certain embodiments, the maximum allowable angle is 360 degrees, though it is envisioned that the user will generally select a smaller angle for the isolated sweep area. Once the angle of the isolated seep area is selected, the image adjusts, so that only the selected area is shown and it expands as large as possible vertically on the screen and centers itself horizontally on the screen, as shown in FIG. 8. When a user chooses to isolate an area, the isolate setup is not passed across the network, but the selected isolation area is sent across the network once the user presses the check key. To clear the sweep area, a user opens the Sweep Xpress menu. A new menu is added: "Resume Full Sweep". To edit the sweep area, the user selects Isolate Sweep Area, again.

All of the SI enhancement features available from the assignee of the instant application in their commercial products are available in embodiment of the present invention, but they are only applied to the 360-degree sonar imaging system return. SI menus are not affected, and a Contour Mode is included.

The 360-degree range is the same as the SI range in that the user can adjust the range from 0-360 ft. in some embodiments. If the user has the sonar transducer assembly 106 set as the SI source, the 360-degree range and SI range will be synced so that any changes to one will affect the other. If the user has a traditional transducer selected as the SI source, the SI range and the 360-degree range will be completely independent settings.

In a particular embodiment, the sonar transducer assembly 106 also functions like a side-scan sonar imaging source by choosing that feature from the Network Source Setup menu.

In a particular embodiment, the rotatable shaft of motor 166 is configured to lock into position such that sonar beam from the sonar element 160 is directed in one direction, for example from the side of a boat. If the sonar transducer assembly 106 includes first and second sonar elements 160, the beams could be directed in opposite directions, from each side of the boat perpendicular to the direction of travel, allowing the user to obtain sonar imaging of the area to each side of the sonar transducer assembly 106 and the boat.

Figures 9, 10:
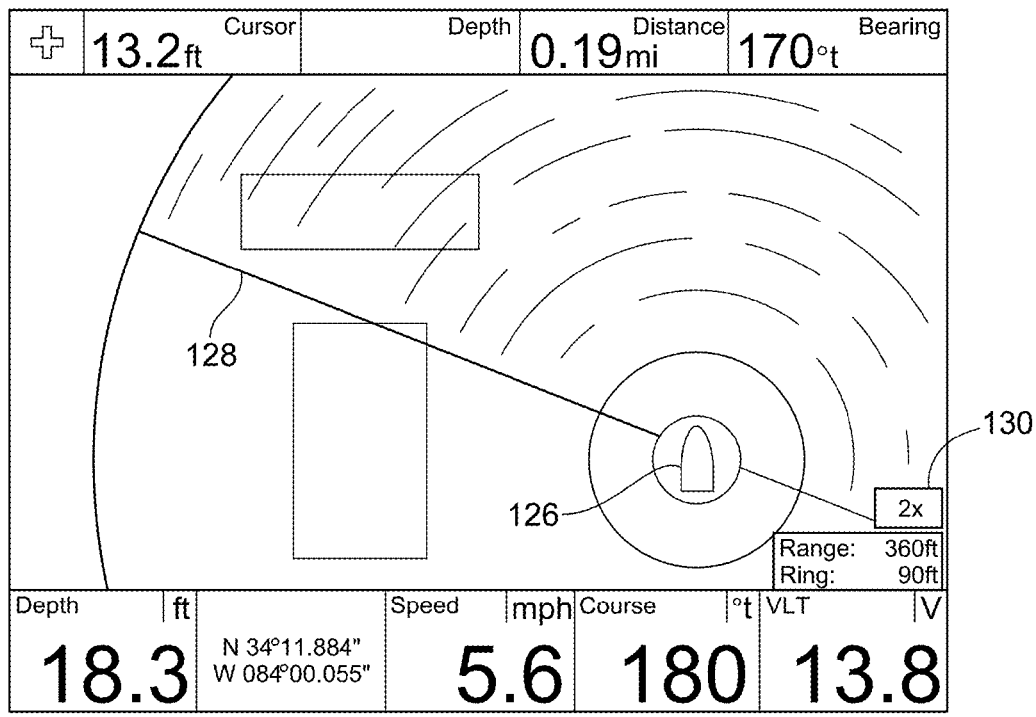
FIG. 9 illustrates a Network Source Setup menu, according to an embodiment of the invention.
FIG. 10 is a screen shot illustration of an exemplary 360-degree display of the Cursor function showing the zoomed 360-degree view with the cursor active in accordance with an embodiment of the invention.

FIG. 9 shows an example of the Network Source Setup menu 134 as it would appear in particular embodiments of the invention. When the sonar transducer assembly 106 is detected, it is added to the SI/DI sonar source tab 135. In addition, a "360" source tab 136 is added to the Network Source Setup menu 134 as shown, for example, in FIG. 9. If a single sonar transducer assembly 106 is detected anywhere on the network, it will be set as the 360 Source. If more than one sonar transducer assembly 106 is detected, the first one detected will be set as the source by default.

The following rules for operating the sonar transducer assembly 106 in its spinning mode (360-degree) as compared to the rules for operating the conventional fixed sonar transducers (e.g., side imaging) will apply in at least one embodiment of the invention. If the user sets the SI/DI source to a traditional imaging transducer, all SI, DI (down scan imaging}, and 2-D (two dimensional) views and view combinations will be available in the rotation. When any SI or DI views are displayed, the sonar transducer assembly 106 will stop pinging (if no other control head 110 is using it) and the traditional imaging transducer will begin pinging. If a sonar transducer assembly 106 is selected on another control head 110, running the sonar transducer assembly 106 and conventional sonar transducers simultaneously on the same beam frequency may cause interference issues, but it is allowed. All Xpress Menus are the standard set for each view. Going to a 360-degree view stops the SI elements from pinging (if no other control head 110 is using them) and re-starts the sonar transducer assembly 106 if it has stopped. If the user sets the SI source to the sonar transducer assembly 106, all SI, DI, and 2-D views and view combinations will be available in the rotation.

In at least one embodiment of the invention, changing views to an SI or DI view for more than three seconds will lock the sonar transducer assembly 106 into SI position. When this happens, remote control heads 110 that have an MSS view up will only show the pings from the locked position and the rest of the rotation will be blank. The last unit to set the MSS state to changed or locked by changing views will win. All Xpress Menus are the standard set for each view. An indicator/icon is added to the SI/DI views to show that the sonar transducer assembly 106 is being used as the source. Going to a 360-degree view re-starts the sweeping of the sonar transducer assembly 106. Going to a 2-D or 2-D/GPS Combo View, does not affect any pinging. In either scenario, when the user goes to a non-sonar view (i.e., charts, birds eye, accessories) the last transducer that was active will continue to ping. For example, if the user leaves a SI view with the sonar transducer assembly 106 as the source, the sonar transducer assembly 106 will continue to ping in SI lock position until it is retracted or a 360-degree view is selected.

A 360 Sensitivity feature is also available in certain embodiments. This feature may be located in the Xpress Menu on MSS Views, and adjusts the sensitivity of the return. Any view using the sweep data (MSS, SI, or DI) will show the same sensitivity value. It cannot be adjusted independently per data/view type in one embodiment. There is also a 360

Speeds menu. From the Xpress Menu, the user can select one of five sweep speeds: 1) Slow; 2) Fine/Fast; 3) Standard; 4) Course/Faster; and 5) Faster.

In certain embodiments, Zoom and Cursor functions are also available. FIG. 10 shows a screen shot of an exemplary control head display in which the Zoom and Cursor features are provided. The control head 110 may include key marked with "+" or "−". Pressing these +/− keys adjusts the zoom level. With no active cursor, the Zoom function is performed at the center of the boat 104, whose typical location 126 on the display is shown in FIG. 7, for example. With an active cursor 128, as shown in FIG. 10, the Zoom function is performed at the cursor 128. A Zoom value label 130 is also shown on the display. Zoom should be available on all 360-degree views and in all modes (normal, isolate, and quick sweep) in various embodiments. Zoom without an active cursor 128 will show live data centered on the boat 104. The directional pad moves the sonar data under the cursor that is fixed on the boats default location. Compass data may be used to show the boat heading. The functionality is the same as Cursor on the chart view. The Cursor feature will use the course-over-ground as the assumed heading if no compass readout is detected. When the cursor 128 is active, the data should not be frozen on the screen. Cursor data will stay live until the user invokes the Zoom function. Cursor and Zoom will freeze the screen. The Cursor calculations for distance and bearing are calculated in a separate buffer from the SI values so that they are more accurate.

Figure 11:
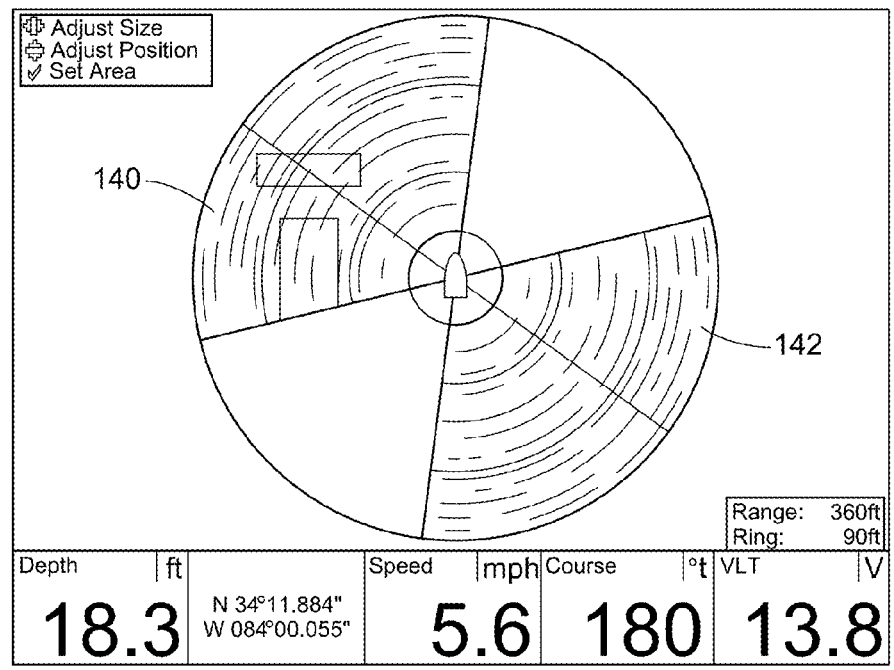
FIG. 11 is a screen shot illustration of an exemplary 360-degree display of the Quick View Sweep Area function showing the quick view sweep in accordance with an embodiment of the invention.

Embodiments of the present invention also include a Quick View Sweep Area function. As will be shown below, an embodiment of the sonar transducer assembly 106 includes two sonar elements whose sonar signals are transmitted in different directions, that is, transmitted in directions spaced up to approximately 180 degrees apart. This configuration allows for an isolated sweep of two regions simultaneously. FIG. 11 shows an example of the control head display with first and second sector scans, or angled sweep areas 140, 142, where the first angled sweep area 140 is centered approximately 180 degrees from the center of the second angled sweep area 142. In a particular embodiment, the control head 110 includes an Enter key, and on the MSS views, the control head 110 quickly and temporarily isolates an area of the sweep. When the Enter key is pressed, the sweep will reverse. When Enter is pressed again it will again reverse and continue to sweep the area between the two key-press locations, as shown in FIG. 11, until the Enter key is pressed a third time to exit the Quick View. The minimum allowable angle that can be set with the Quick View is 10 degrees in one embodiment, although other minimum angles may be set in alternate embodiments. This works whether the Isolated Sweep Area is activated or not. Isolating the sweep on one view isolates it on all views.

Figure 12:
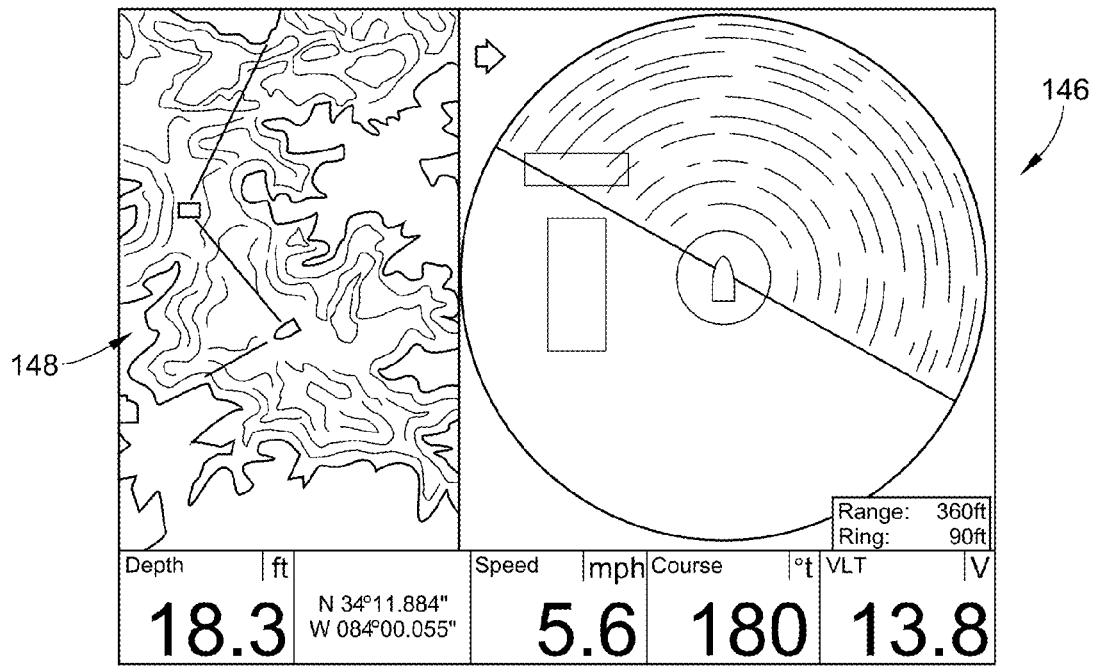
FIG. 12 is a screen shot illustration of an exemplary 360-degree display of the Combination View function showing the 360-degree and chart views in accordance with an embodiment of the invention.
Figure 13:
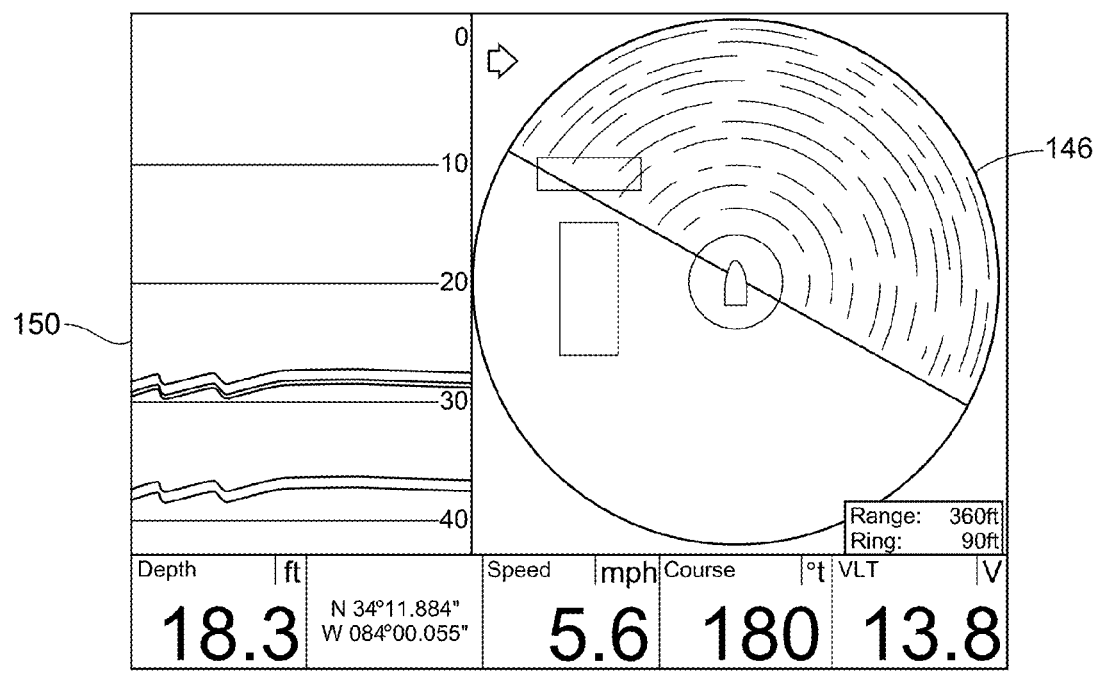
FIG. 13 is a screen shot illustration of an exemplary 360-degree display of the Combination View function showing the MSS and 2-D views in accordance with an embodiment of the invention.

New MSS views will be available as described below on the control head 110 (shown in FIG. 2), which may include any one of the Humminbird 800-, 900-, and 1100-series capable units available from the assignee of the instant application. The 700 series, also available from the assignee of the instant application, will only support a full-screen view. As shown in FIG. 12, an MSS+Chart Combo View is provided, according to an embodiment of the invention. The MSS or 360-degree view 146 gets cropped as the split is moved to the right, while the chart view 148 occupies the left pane of the display, as shown in FIG. 12. Each pane is controlled individually, but the Retract menu is in both Xpress Menus. An additional feature, an MSS+2-D Combo View is illustrated in FIG. 13, according to an embodiment of the invention. The MSS or 360-degree View 146 gets cropped as the split is moved to the right, while the 2-D view 150 occupies the left pane of the display. In some embodiments, each pane is controlled individually, but the Retract menu is in both Xpress Menus. However, a full screen MSS view is also available. In a particular embodiment, through an Xpress Menu Option (Display), the view can be set to display all 360 degrees of the sweep, or offset to highlight a section of the sweep. The view options are available in the Display menu in the Xpress Menu.

Figure 14:
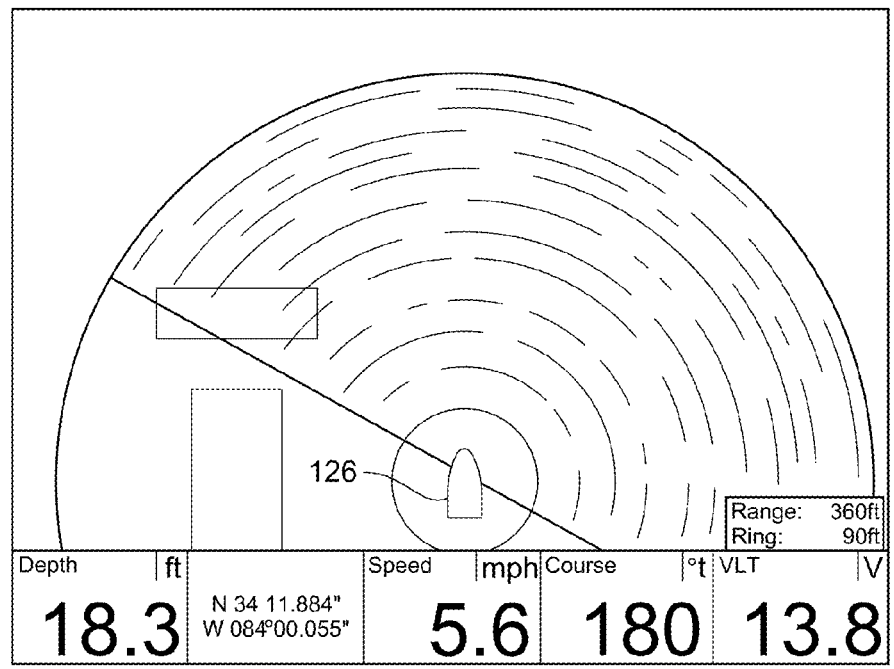
FIG. 14 is a screen shot illustration of an exemplary 360-degree display of the Offset View function showing the front offset view in accordance with an embodiment of the invention.
Figure 15:
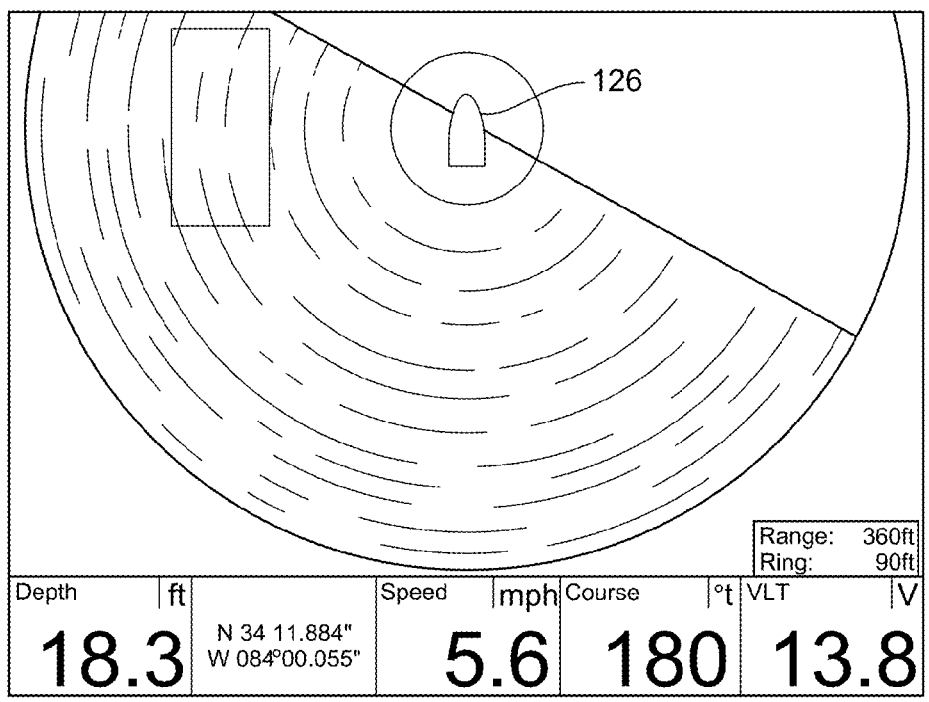
FIG. 15 is a screen shot illustration of an exemplary 360-degree display of the Offset View function showing the rear offset view in accordance with an embodiment of the invention.

FIG. 14 shows an example of a display in which a Front Offset feature has been activated. As shown in FIG. 14, in a particular embodiment, the Front Offset view is also available at 1× zoom (normal). This view is restricted by left and right edges of the screen. When the zoom level increases, the sonar image pushes off the side edges of the screen and continues to maximize the vertical space. This is just like Zoom on the 360-degree view. The boat location 126 on the display is shown just above the data boxes on the 1100 series, near the bottom of the screen. FIG. 15 shows an example of a display in which a Rear Offset feature has been activated. At 1× zoom (normal), this view is restricted by left and right edges of the screen. When the zoom level increases, the sonar image pushes off the side edges of the screen and continues to maximize the vertical space.

Figure 16:
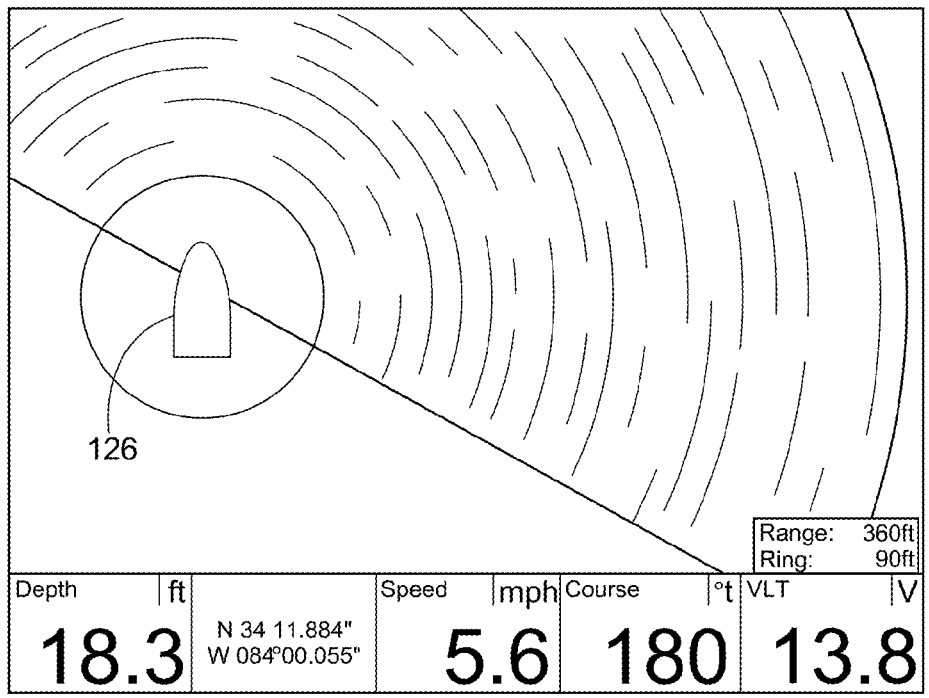
FIG. 16 is a screen shot illustration of an exemplary 360-degree display of the Offset View function showing the right offset view in accordance with an embodiment of the invention.
Figure 17:
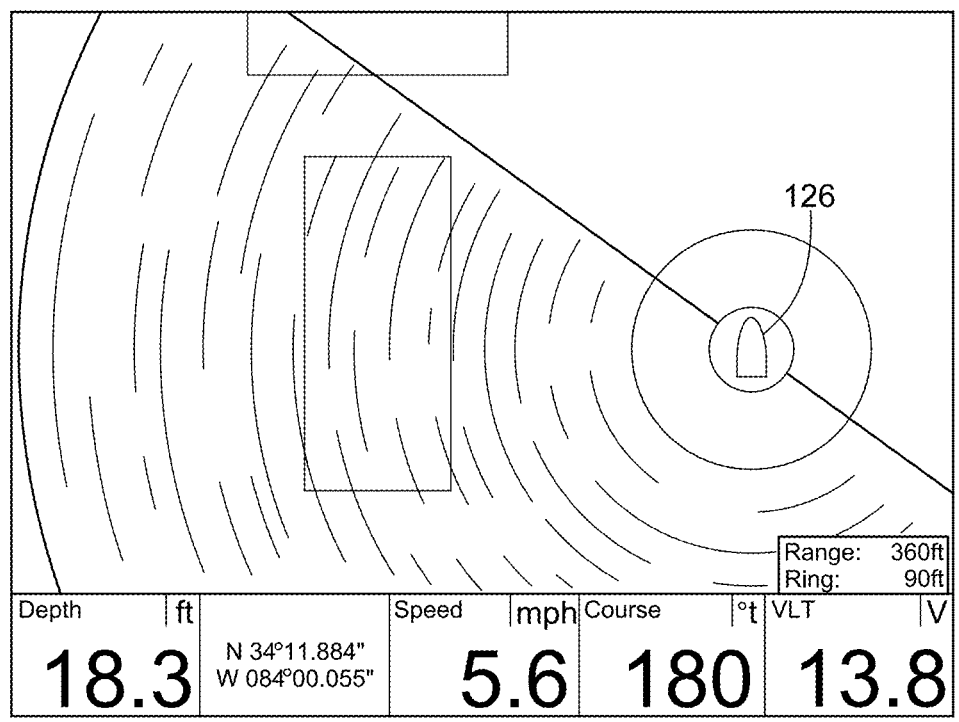
FIG. 17 is a screen shot illustration of an exemplary 360-degree display of the Offset View function showing the left offset view, in accordance with an embodiment of the invention.

FIG. 16 shows an example of a display in which a Right Offset feature has been activated. In particular embodiments, this feature offsets the center of the display horizontally so that the boat location 126 on the display is at ⅓ the width of the screen. In the example shown, the view is maximized to the right edge of the screen at 1× zoom. The boat location 126 on the display is still centered vertically. The top and bottom of the display are cut off. Zoom and Pan still function in the same manner as in any other view. FIG. 17 shows an example of a display in which a Left Offset feature has been activated. This feature offsets the center of the display horizontally so that the boat location 126 on the display is at ⅔ the width of the screen. In the example shown, the view is maximized to the left edge of the screen. The boat location 126 on the display is still centered vertically. The top and bottom of the display are cut off. Zoom and Pan still function the same as in any other view.

In embodiments of the invention where compass data is accessible, additional features are available. In a particular embodiment, navigation data on MSS views is available. Control heads 110 with compass data allows for certain navigation related items, including the current boat heading, to be displayed. In at least one embodiment, all of the items can be turned on/off as a group via a "Navigation on MSS" menu which could be located in the 360 submenu. If at any point, the compass data becomes unavailable, the navigation data will be removed from the display. For example, waypoints, navigation alarm limits, route lines, etc., may be displayed.

Based on embodiments of the invention disclosed herein, it can be seen that users of the 360-degree sonar imaging system can, among other things, isolate the sweep area over a section of water from, for example, 10 degrees to 360 degrees. The user can lock in the beam anywhere, but, in many cases, the area in front of the boat is especially useful. With valuable intelligence on fish-holding structure and cover waiting up ahead, a user can cast to productive areas without scaring away the fish. Because the beam has less ground to cover, the system may realize a faster refresh rate. As described above, embodiments of the present invention may also provide preset views, e.g., Front, Rear, Left, Right. The user can also isolate these sweep areas and adjust its size.

In particular embodiments, the user can choose from eight color palettes for more flexibility. Based on water conditions, the user can adjust sensitivity for the best sonar image. In some embodiments, the user can even adjust sharpness to enhance edges and detail depending on lighting. In a more particular embodiment, the MSS assembly 100 is able to take advantage of and process present and historic GPS data, sonar data, and compass data to put a plurality of waypoints, routes and other navigational information at the user's fingertips. With waypoint navigation provided, the user can mark desirable locations with a waypoint directly on the user's 360-degree sonar imaging system display. The GPS data for the location will be stored in the control head's 110 memory and can be displayed on a GPS Cartography view.

In a particular embodiment, the user starts the process by moving the cursor to a desired position on the 360-degree sonar imaging screen. When the "Mark" button is pressed the present pixel location is converted to a sonar range and referenced back to the historic sonar ping number (HSPN) data used to draw that display segment. The stored boat GPS position, boat heading, water depth, transducer side (since there are two elements) and transducer bearing are recalled for that HSPN. If the display is not presently using slant angle corrected data, then the sonar range is slant angle range corrected using the depth from that HSPN. The GPS position for that waypoint is calculated from the HSPN boat position offset by the slant angle corrected range at a bearing that is calculated from the HSPN boat bearing corrected for the HSPN transducer side and bearing.

FIGS. 29 and 30 are photographic illustrations of an exemplary 360-degree display and a sector scan display, respectively. These photographs are provided as an example of the detailed imagery, produced by the 360-degree sonar imaging system as described herein. Such detailed imaging is typically not available from conventional sonar systems used by anglers. The enhanced imagery, which produces more photo like imaging than typically seen in conventional sonar imaging systems is the result of sonar beams that are wide in the vertical direction for a good area of coverage and very narrow in the horizontal direction for good image definition. As explained above, a narrow beam may be thought of as one less than five degrees, while a wide beam may be thought of as one greater than 60 degrees. This beam configuration, in combination with a suitably-selected sweeping or scanning velocity of the sonar elements produces images such as shown in FIGS. 29 and 30, which, in this case, clearly show a sunken tree resting on a lake bed.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Prospectively, variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A 360-degree sonar imaging system, comprising:
 a sonar transducer assembly comprising:
  a motor having a rotatable shaft;
  a sonar element carrier having a first sonar element mounted therein, the sonar element carrier coupled to the rotatable shaft; and
  a controller for driving the first sonar element and for communicating information received from the sonar elements;
 a deployment mechanism coupled to the sonar transducer assembly for deployment and retraction thereof;
 wherein the controller is configured to communicate with a control head to enable display of 360-degree sonar images on a display screen of the control head;
 wherein the deployment mechanism further comprises a fairing block configured to protectively house the sonar transducer assembly in a retracted position, the fairing block attached to the hull of a boat;
 wherein the sonar transducer assembly is deployed outside of the fairing block at the end of an articulating arm, the articulating arm configured to be positioned by a connecting arm attached to a track at one end and to the articulating arm at another end; and
 wherein the end of the connecting arm attached to the track is positioned via a magnetic connection to an adjacent magnet which can be moved along a shaft positioned within the fairing block.

2. The 360-degree sonar imaging system of claim 1, wherein the magnet is attached to a threaded carrier, and the shaft is a screw which rotates to position the magnet at a desired position along the length of the screw.

3. A 360-degree sonar imaging system, comprising:
 a sonar transducer assembly comprising:
  a motor having a rotatable shaft;
  a sonar element carrier having a first sonar element mounted therein, the sonar element carrier coupled to the rotatable shaft; and
  a controller for driving the first sonar element and for communicating information received from the sonar elements;
 a deployment mechanism coupled to the sonar transducer assembly for deployment and retraction thereof;
 wherein the controller is configured to communicate with a control head to enable display of 360-degree sonar images on a display screen of the control head;

wherein the deployment mechanism is a transom-mounted deployment mechanism comprising:
a housing configured to mount to the transom of a boat;
an extendable shaft disposed at least partially within the housing, the sonar transducer assembly attached to one end of the extendable shaft disposed underwater;
wherein the sonar transducer assembly is closest to the boat in a retracted position and farther from the boat in a deployed position; and
wherein the sonar transducer assembly has a housing with variable wall thickness such that each of a plurality of rays emanating at various angles from the sonar element and passing from inside of the housing to outside of the housing passes through a relatively constant amount of the housing wall.

4. A 360-degree sonar imaging system, comprising:
a sonar transducer assembly comprising:
a motor having a rotatable shaft;
a sonar element carrier having a first sonar element and a second sonar element mounted therein, the sonar element carrier coupled to the rotatable shaft; and
a controller for driving the first and second sonar elements and for communicating information received from the first and second sonar elements;
wherein the controller communicates with a control head to enable a display of a 360-degree sonar image on a display screen of the control head; and
wherein the sonar transducer assembly has a housing with variable wall thickness such that each of a plurality of rays emanating at various angles from the two sonar elements and passing from inside of the housing to outside of the housing passes through a relatively constant amount of the housing wall.

5. The 360-degree sonar imaging system of claim 4, wherein the first and second sonar elements are mounted such that the imaging beams have a depression angle of between 20 and 40 degrees.

6. The 360-degree sonar imaging system of claim 5, wherein the depression angle is 30 degrees.

7. The 360-degree sonar imaging system of claim 4, wherein the first sonar element is configured to transmit its sonar signal in a first direction to produce a first sonar image, and the second sonar element is configured to transmit its sonar signals in a second direction to produce a second sonar image, and wherein the first direction is spaced up to approximately 180 degrees apart from the second direction.

8. The 360-degree sonar imaging system of claim 4, wherein the rotatable shaft is configured to lock into position such that sonar beams from the first and second sonar elements are directed in opposite directions, to obtain sonar imaging of the area to each side of the sonar transducer assembly.

9. The 360-degree sonar imaging system of claim 4, wherein the sonar signal from the first sonar element is processed exclusively by a first sonar receiver, and the sonar signal from the second sonar element is processed exclusively by a second sonar receiver.

10. The 360-degree sonar imaging system of claim 4, wherein the sonar transducer assembly further comprises a circuit board having concentric circular tracks configured to maintain an electrical connection with the sonar element carrier as it rotates.

11. The 360-degree sonar imaging system of claim 10, wherein the sonar transducer assembly further comprises an electromagnetic (EM) shield coupled to the sonar element carrier, and positioned between the sonar element carrier and the circuit board.

12. The 360-degree sonar imaging system of claim 11, wherein the EM shield is made from fiberglass having copper laminate on one side.

13. The 360-degree sonar imaging system of claim 11, wherein the EM shield has cutout portions where the sonar element carrier contact the concentric circular tracks of the circuit board.

14. The 360-degree sonar imaging system of claim 4, wherein the motor is a stepper motor.

15. The 360-degree sonar imaging system of claim 4, wherein the motor is configured to rotate the rotatable shaft back and forth between two points, such that an angled sonar image representing a portion of the 360-degree sonar image is displayed on the display screen.

16. The 360-degree sonar imaging system of claim 15, wherein a user can select an angle of the angled sonar image where the angle of the angled sonar image ranges from between 10 degrees and 360 degrees.

17. The 360-degree sonar imaging system of claim 16, further comprising a control that allows the user to reverse the sweep of the rotatable shaft when a desired target is identified, wherein use of the control allows the user to define the angle of the angled sonar image.

18. The 360-degree sonar imaging system of claim 17, wherein the control further allows the user to resume a 360-degree sonar imaging scan.

19. The 360-degree sonar imaging system of claim 16, wherein the controller communicates, to the control head, a first angled sonar image and a second angled sonar image, wherein the first angled sonar image is centered approximately 180 degrees apart from a center of the second angled sonar image.

20. The 360-degree sonar imaging system of claim 4, further comprising a tripod configured to rest on the bed of a body of water, the sonar transducer assembly being attached to an upper portion of the tripod and connected to a control head remote from the sonar transducer assembly.

21. The 360-degree sonar imaging system of claim 4, further comprising a buoy configured with a flexible link between the buoy and sonar transducer assembly to stabilize the sonar transducer assembly at or near a surface of a body of water, the sonar transducer assembly being attached to a lower portion of the buoy and connected to a control head remote from the sonar transducer assembly.

22. The 360-degree sonar imaging system of claim 4, wherein a user can select from among multiple speeds at which to rotate the rotatable shaft and attached sonar elements.

23. A 360-degree sonar imaging system, comprising:
a sonar transducer assembly comprising:
a motor having a rotatable shaft;
a sonar element carrier having a pair of sonar elements mounted therein, the sonar element carrier coupled to the rotatable shaft; and
a controller for driving the sonar elements and for communicating information received from the sonar elements;
wherein the sonar transducer assembly is attached to a first end of a hand-held rod, and a control head and portable display screen is connected, via cable, to a second end of the hand-held rod opposite the first end;
wherein the sonar transducer assembly includes a housing with variable wall thickness such that each of a plurality of rays emanating at various angles from the two sonar elements and passing from inside of the housing to outside of the housing passes through a relatively constant amount of the housing wall; and a stabilizing member attached to the hand-held rod between the first and second ends, the stabilizing member configured to stabilize the shaft when the first end is place into water through a hole in a frozen surface of a body of water.

24. The 360-degree sonar imaging system of claim 23, wherein the stabilizing member includes three arms, wherein each of the three arms has a first end attached to the shaft and a second end configured to rest on the frozen surface of a body of water.

25. The 360-degree sonar imaging system of claim 23, wherein the stabilizing member includes a ring configured to rest on the frozen surface of a body of water, the ring connected to the shaft.

26. The 360-degree sonar imaging system of claim 23, wherein the stabilizing member is a plank stabilizer configured to span the hole in the frozen surface of the body of water and rest on the frozen surface.

27. The 360-degree sonar imaging system of claim 23, wherein the motor is configured to rotate back and forth between two points, such that an angled sonar image representing a portion of the 360-degree sonar image is displayed on the portable display screen, and wherein the controller communicates, to the control head, a first angled sonar image and a second angled sonar image, wherein the first angled sonar image is centered approximately 180 degrees apart from a center of the second angled sonar image.

28. The 360-degree sonar imaging system of claim 27, wherein a user can select an angle of the angled sonar image where the angle ranges from between 10 degrees and 360 degrees.

* * * * *